US 6,857,878 B1

(12) United States Patent
Chosack et al.

(10) Patent No.: US 6,857,878 B1
(45) Date of Patent: Feb. 22, 2005

(54) ENDOSCOPIC TUTORIAL SYSTEM

(75) Inventors: Edna Chosack, Kiryat Ono (IL); David Barkay, Kiryat Ono (IL); Ran Bronstein, Modiin (IL)

(73) Assignee: Simbionix Ltd., Lod (IL)

( * ) Notice: Subject to any disclaimer, the term of this patent is extended or adjusted under 35 U.S.C. 154(b) by 0 days.

(21) Appl. No.: 09/600,952

(22) PCT Filed: Jan. 15, 1999

(86) PCT No.: PCT/IL99/00028
§ 371 (c)(1),
(2), (4) Date: Jul. 25, 2000

(87) PCT Pub. No.: WO99/38141
PCT Pub. Date: Jul. 29, 1999

(30) Foreign Application Priority Data

Jan. 26, 1998 (IL) .................................................. 123073

(51) Int. Cl.[7] .............................................. G09B 23/28
(52) U.S. Cl. ........................ 434/267; 434/262; 600/104
(58) Field of Search ................................ 434/262, 272; 600/104–107

(56) References Cited

U.S. PATENT DOCUMENTS

| | | |
|---|---|---|
| 5,459,382 A | 10/1995 | Jacobus et al. |
| 5,513,100 A | 4/1996 | Parker et al. |
| 5,623,582 A | 4/1997 | Rosenberg |
| 5,629,594 A | 5/1997 | Jacobus et al. |
| 5,666,138 A | 9/1997 | Culver |
| 5,691,898 A | 11/1997 | Rosenberg et al. |
| 5,701,140 A | 12/1997 | Rosenberg et al. |
| 5,704,791 A | 1/1998 | Gillio |
| 5,721,566 A | 2/1998 | Rosenberg et al. |
| 5,734,373 A | 3/1998 | Rosenberg et al. |
| 5,739,811 A | 4/1998 | Rosenberg et al. |
| 5,754,023 A | 5/1998 | Roston et al. |
| 5,766,016 A * | 6/1998 | Sinclair et al. ............. 434/262 |
| 5,767,839 A | 6/1998 | Rosenberg |
| 5,769,640 A | 6/1998 | Jacobus et al. |
| 5,771,181 A | 6/1998 | Moore et al. |
| 5,776,050 A | 7/1998 | Chen et al. |
| 5,800,177 A | 9/1998 | Gillio |
| 5,800,178 A | 9/1998 | Gillio |
| 5,800,179 A * | 9/1998 | Bailey .......................... 434/262 |
| 5,805,140 A | 9/1998 | Rosenberg et al. |
| 5,821,920 A | 10/1998 | Rosenberg et al. |

(List continued on next page.)

FOREIGN PATENT DOCUMENTS

| | | |
|---|---|---|
| DE | 3937035 | 7/1989 |
| EP | 609 363 B1 | 10/1992 |
| WO | 91/06935 | 5/1991 |
| WO | 96/18942 | 12/1995 |
| WO | 96/28800 | 3/1996 |
| WO | 96/30885 | 3/1996 |

OTHER PUBLICATIONS

Cover, Steven A. and Ezquerra, Norberto F. and O'Brien, James F. "Interactively Deformable Models for Surgery Simulation", Nov. 1993, IEEE COmputer Graphics & Applications, pp. 68–75.*

Primary Examiner—Joe H. Cheng
Assistant Examiner—Cameron Saadat
(74) Attorney, Agent, or Firm—G.E. Ehrlich Ltd.

(57) ABSTRACT

A system for simulating a medical procedure performed on a subject, featuring a simulated organ, a simulated medical instrument and a locator for determining the location of the instrument in the organ. The system further features a visual display for displaying images from the medical procedure. The visual display also includes a three-dimensional mathematical model for modeling the organ, which is divided into a plurality of linear segments. The location of the instrument in the organ is used to select the segment, which in turn is used to select the images for display on the visual display.

4 Claims, 20 Drawing Sheets

U.S. PATENT DOCUMENTS

| | | | |
|---|---|---|---|
| 5,825,308 A | 10/1998 | Rosenberg | |
| 5,828,197 A | 10/1998 | Martin et al. | |
| 5,831,408 A | 11/1998 | Jacobus et al. | |
| 5,844,392 A | 12/1998 | Peurach et al. | |
| 5,872,438 A | 2/1999 | Roston | |
| 5,880,714 A | 3/1999 | Rosenberg et al. | |
| 5,882,206 A | 3/1999 | Gillio | |
| 5,889,670 A | 3/1999 | Schuler et al. | |
| 5,889,672 A | 3/1999 | Schuler et al. | |
| 5,907,487 A | 5/1999 | Rosenberg et al. | |
| 5,929,607 A | 7/1999 | Rosenberg et al. | |
| 5,929,846 A | 7/1999 | Rosenberg et al. | |
| 5,956,040 A * | 9/1999 | Asano et al. | 345/419 |
| 5,956,484 A | 9/1999 | Rosenberg et al. | |
| 5,959,613 A | 9/1999 | Rosenberg et al. | |
| 5,999,168 A | 12/1999 | Rosenberg et al. | |
| 6,020,875 A | 2/2000 | Moore et al. | |
| 6,020,876 A | 2/2000 | Rosenberg et al. | |
| 6,020,967 A | 2/2000 | Gregorio | |
| 6,024,576 A | 2/2000 | Bevirt et al. | |
| 6,028,593 A | 2/2000 | Rosenberg et al. | |
| 6,037,927 A | 3/2000 | Rosenberg | |
| 6,046,727 A | 4/2000 | Rosenberg et al. | |
| 6,050,718 A | 4/2000 | Schena et al. | |
| 6,057,828 A | 5/2000 | Rosenberg et al. | |
| 6,067,077 A | 5/2000 | Martin et al. | |
| 6,069,634 A * | 5/2000 | Gibson | 345/424 |
| 6,071,233 A * | 6/2000 | Ishikawa et al. | 600/104 |
| 6,078,308 A | 6/2000 | Rosenberg et al. | |
| 6,088,017 A | 7/2000 | Tremblay et al. | |
| 6,088,019 A | 7/2000 | Rosenberg et al. | |
| 6,100,874 A | 8/2000 | Schena et al. | |
| 6,101,530 A | 8/2000 | Rosenberg et al. | |
| 6,104,158 A | 8/2000 | Jacobus et al. | |
| 6,104,382 A | 8/2000 | Martin et al. | |
| 6,106,301 A * | 8/2000 | Merril | 434/262 |
| 6,125,385 A | 9/2000 | Wies et al. | |
| 6,128,006 A | 10/2000 | Rosenberg et al. | |
| 6,131,097 A | 10/2000 | Peurach et al. | |
| 6,147,674 A | 11/2000 | Rosenberg et al. | |
| 6,154,198 A | 11/2000 | Rosenberg | |
| 6,154,201 A | 11/2000 | Levin et al. | |
| 6,161,126 A | 12/2000 | Wies et al. | |
| 6,283,763 B1 * | 9/2001 | Matsuzaki et al. | 434/262 |
| 6,701,173 B2 * | 3/2004 | Nowinski et al. | 600/407 |

\* cited by examiner

ENDOSCOPIC TUTORIAL SYSTEM

FIELD AND BACKGROUND OF THE INVENTION

The present invention relates to a system and method for teaching and training students in medical procedures, and in particular to a system and method for training students in the procedure of endoscopy.

Endoscopy, and in particular flexible gastro-endoscopy, are examples of minimally invasive medical procedures. Flexible gastro-endoscopy is an important medical tool for both surgical and diagnostic procedures in the gastro-intestinal tract. Essentially, gastro-endoscopy is performed by inserting an endoscope, which is a flexible tube, into the gastro-intestinal tract, either through the mouth or the rectum of the subject. The tube is manipulated by a trained physician through specialized controls. The end of the tube which is inserted into the subject contains a camera and one or more surgical tools, such as a clipper for removing tissue samples from the gastro-intestinal tract. The physician must maneuver the tube according to images of the gastro-intestinal tract received from the camera and displayed on a video screen. The lack of direct visual feedback from the gastro-intestinal tract is one factor which renders endoscopy a complex and difficult procedure to master. Such lack of feedback also increases the difficulty of hand-eye coordination and correct manipulation of the endoscopic device. Thus, flexible gastro-endoscopy is a difficult procedure to both perform and to learn.

Currently, students are taught to perform flexible gastro-endoscopy according to the traditional model for medical education, in which students observe and assist more experienced physicians. Unfortunately, such observation alone cannot provide the necessary training for such complicated medical procedures. Students may also perform procedures on animals and human cadavers, neither of which replicates the visual and tactile sensations of a live human patient. Thus, traditional medical training is not adequate for modem technologically complex medical procedures.

In an attempt to provide more realistic medical training for such procedures, simulation devices have been developed which attempt to replicate the tactile sensations and/or visual feedback for these procedures, in order to provide improved medical training without endangering human patients. An example of such a simulation device is disclosed in U.S. Pat. No. 5,403,191, in which the disclosed device is a box containing simulated human organs. Various surgical laparoscopic procedures can be performed on the simulated organs. Visual feedback is provided by a system of mirrors. However, the system of both visual and tactile feedback is primitive in this device, and does not provide a true representation of the visual and tactile sensations which would accompany such surgical procedures in a human patient. Furthermore, the box itself is not a realistic representation of the three-dimensional structure of a human patient. Thus, the disclosed device is lacking in many important aspects and fails to meet the needs of a medical simulation device.

Attempts to provide a more realistic experience from a medical simulation devices are disclosed in PCT Patent Application Nos. WO 96/16389 and WO 95/02233. Both of these applications disclose a device for providing a simulation of the surgical procedure of laparoscopy. Both devices include a mannequin in the shape of a human torso, with various points at which simulated surgical instruments are placed. However, the devices are limited in that the positions of the simulated surgical instruments are predetermined, which is not a realistic scenario. Furthermore, the visual feedback is based upon a stream of video images taken from actual surgical procedures. However, such simple rendering of video images would result in inaccurate or unrealistic images as portions of the video data would need to be removed for greater processing speed. Alternatively, the video processing would consume such massive amounts of computational time and resources that the entire system would fail to respond in a realistic time period to the actions of the student. At the very minimum, a dedicated graphics workstation would be required, rather than a personal computer (PC). Thus, neither reference teaches or discloses adequate visual processing for real time visual feedback of the simulated medical procedure.

Similarly, U.S. Pat. No. 4,907,973 discloses a device for simulating the medical procedure of flexible gastro-endoscopy. The disclosed device also suffers from the deficiencies of the above-referenced prior art devices, in that the visual feedback system is based upon rendering of video data taken from actual endoscopic procedures. As noted previously, displaying such data would either require massive computational resources, or else would simply require too much time for a realistic visual feedback response. Thus, the disclosed device also suffers from the deficiencies of the prior art.

A truly useful and efficient medical simulation device for minimally invasive therapeutic procedures such as endoscopy would give real time, accurate and realistic visual feedback of the procedure, and would also give realistic tactile feedback, so that the visual and tactile systems would be accurately linked for the simulation as for an actual medical procedure. Unfortunately, such a simulation device is not currently taught or provided by the prior art.

There is therefore a need for, and it would be useful to have, a method and a system to simulate a minimally invasive medical procedure such as endoscopy, which would provide accurate, linked visual and tactile feedback to the student and which would serve as a training resource for all aspects of the procedure.

SUMMARY OF THE INVENTION

The present invention includes a method and a system to simulate the minimally invasive medical procedure of endoscopy, particularly of flexible gastro-endoscopy. The system is designed to simulate the actual medical procedure of endoscopy as closely as possible by providing both a simulated medical instrument, and tactile and visual feedback as the simulated procedure is performed on the simulated patient.

According to the present invention, there is provided a system for performing a simulated medical procedure, comprising: (a) a simulated organ; (b) a simulated instrument for performing the simulated medical procedure on the simulated organ; (c) a locator for determining a location of the simulated instrument within the simulated organ; and (d) a visual display for displaying images according to the location of the simulated instrument within the simulated organ for providing visual feedback, such that the images simulate actual visual data received during an actual medical procedure as performed on an actual subject, the visual display including: (i) a mathematical model for modeling the simulated organ according to a corresponding actual organ, the model being divided into a plurality of segments; (ii) a loader for selecting at least one of the plurality of segments for display, the at least one of the plurality of segments being selected according to the location of the simulated instrument within the simulated organ; (iii) a controller for selecting a simulated image from the segment according to the location of the simulated instrument; and (iv) a displayer for displaying the simulated image.

Preferably, the visual displayer further comprises: (v) a texture mapping database for storing texture mapping data; and (vi) a texture mapping engine for overlaying the simulated image with the texture mapping data substantially before the simulated image is displayed by the displayer. More preferably, the texture mapping is animation of random movement of the simulated instrument and random movement of the simulated organ.

Also preferably, the texture mapping includes images obtained from performing the actual medical procedure on the actual subject.

More preferably, the images are obtained by first recording the visual data during the performance and then selecting the images from the recorded visual data.

According to a preferred embodiment of the present invention, the mathematical model features a plurality of polygons constructed according to a spline, the spline determining a geometry of the mathematical model in three dimensions. Preferably, a deformation in the mathematical model corresponding to a deformation in the simulated organ is determined by altering the spline. More preferably, the deformation in the simulated organ is a local deformation, the local deformation of the simulated organ being determined according to the mathematical model by adding polygons to a portion of the mathematical model, such that the portion of the mathematical model is deformed to produce the local deformation. Most preferably, the mathematical model is constructed from the spline by modeling the simulated organ as a straight line and altering the spline until the mathematical model fits the corresponding actual organ. Also most preferably, the controller selects the simulated image according to at least one previous movement of the simulated instrument ok within the simulated organ.

According to other preferred embodiments of the present invention, the displayer further displays a graphical user interface. Preferably, the graphical user interface displays tutorial information for aid in performing the medical procedure.

According to still other preferred embodiments of the present invention, the simulated organ is a gastrointestinal tract. Preferably, the gastro-intestinal tract is constructed from a semi-flexible, smooth material. Also preferably, the simulated instrument is an endoscope, the endoscope featuring a sensor for determining a location of the sensor in the gastro-intestinal tract, the system further comprising: (e) a computer for determining the visual feedback according to the location of the sensor.

Preferably, the system also features a tactile feedback mechanism for providing simulated tactile feedback according to the location of the tip of the endoscope.

According to one embodiment of the tactile feedback mechanism, the tactile feedback mechanism is contained in the gastro-intestinal tract, and the gastrointestinal tract further comprises: (i) a plurality of servo-motors; (ii) a piston operated by each of the plurality of servo-motors, the piston contacting the semi-flexible material; and (iii) a controller for controlling the plurality of servo-motors, such that a position of the piston is determined by the controller, and such that the position of the piston provides the tactile feedback.

Alternatively, the tactile feedback mechanism is located in the endoscope, and the endoscope further comprises: (i) a guiding sleeve connected to the tip of the endoscope; (ii) at least one ball bearing attached to the guiding sleeve for rolling along an inner surface of the gastrointestinal tract; (iii) at least one linear motor attached to the guiding sleeve; (iv) a piston operated by the linear motor, the piston contacting the inner surface of the gastro-intestinal tract; and (v) a controller for controlling the linear motor, such that a position of the piston is determined by the controller, and such that the position of the piston provides the tactile feedback.

Also alternatively, the tactile feedback mechanism features: (i) a plurality of rings surrounding the endoscope, each ring having a different radius, at least a first ring featuring a radius greater than a radius of the endoscope and at least a second ring featuring a radius less than the radius of the endoscope, the radius of each of the plurality of rings being controlled according to a degree of inflation with air of each of the plurality of rings, the radius of the rings determining movement of the endoscope; (ii) an air pump for pumping air into the plurality of rings; (iii) at least one tube for connecting the air pump to the plurality of rings; and (iv) an air pump controller for determining the degree of inflation with air of the plurality of rings by controlling the air pump.

Preferably, the at least one tube is two tubes, a first tube for pumping air into the plurality of rings and a second tube for suctioning air from the plurality of rings, and the air pump pumps air into the plurality of rings and sucks air from the plurality of rings, such that the degree of inflation with air of the plurality of rings is determined by alternately pumping air into, and suctioning air from, the plurality of rings.

Also preferably, the gastro-intestinal tract is a substantially straight tube, such that the tactile feedback and the visual feedback are substantially independent of a geometrical shape of the gastrointestinal tract. Preferably, the tactile feedback mechanism is operated according to tactile feedback obtained during the performance of the medical procedure on an actual subject, the tactile feedback being obtained through virtual reality gloves.

According to other preferred embodiments of the system of the present invention, the endoscope further features a handle for holding the endoscope and a tool unit, the tool unit comprising: (i) a simulated tool; (ii) a channel for receiving the simulated master of an actual tool, such as forceps or snare, the channel being located in the handle; (iii) a tool control unit for detecting a movement of the simulated tool, the tool control unit being located in the channel and the tool control unit being in communication with the computer, such that the computer determines the visual feedback and the tactile feedback according to the movement of the simulated tool.

Preferably, the tool control unit detects a location of the simulated tool within the gastrointestinal tract for providing visual feedback.

More preferably, the tool control unit additionally detects a roll of the simulated tool for providing visual feedback.

According to one embodiment of the tool control unit, the tool control unit further comprises: (1) a light source for producing light, the light source being located in the channel; (2) a light wheel for alternately blocking and unblocking the light according to the movement of the simulated tool; and (3) a light detector for detecting the light, such that the computer determines a movement of the simulated tool according to the light detector.

According to another embodiment of the present invention, there is provided a method for performing a simulated endoscopic procedure, comprising the steps of: (a) providing a system for performing the simulated endoscopic procedure, comprising: (i) a simulated gastro-intestinal tract; (ii) a simulated endoscope for performing the simulated endoscopic procedure on the simulated gastrointestinal tract; (iii) a locator for determining a location of the simulated endoscope within the simulated gastro-intestinal tract; and (iv) a visual display for displaying images according to the simulated endoscope within the simulated gastro-intestinal tract, such that the images simulate visual data received during an actual medical procedure as performed on an actual subject, the visual display including: (1) a three-dimensional mathematical model of the simulated gastro-intestinal tract, the model being divided into a plurality of segments; (2) a loader for selecting at least one of the plurality of segments for display, the at least one of the plurality of segments being selected according to the location of the simulated endoscope within the simulated gastrointestinal tract; (3) a controller for selecting a simulated image from the segment according to the location of the simulated instrument, and (4) a displayer for displaying the simulated image according to the controller, such that the simulated image is a displayed image; (b) inserting the simulated endoscope into the simulated gastro-intestinal tract; (c) receiving visual feedback according to the displayed image; and (d) receiving tactile feedback according to the location of the endoscope within the gastrointestinal tract.

Preferably, the displayed image is determined according to at least one previous movement of the simulated endoscope within the simulated gastrointestinal tract.

According to yet another embodiment of the present invention, there is provided a method for displaying simulated visual data of a medical procedure performed on an actual human organ with an actual medical instrument, the method comprising the steps of: (a) recording actual data from a performance of an actual medical procedure on a living human patient; (b) abstracting a plurality of individual images from the actual data; (c) digitizing the plurality of individual images to form a plurality of digitized images; (d) selecting at least one of the plurality of digitized images to form a selected digitized image; (e) storing the selected digitized image as texture mapping data in a texture mapping database; (f) providing mathematical model of the actual human organ, the model being divided into a plurality of segments; (g) selecting one of the plurality of segments from the model for display; (h) overlaying the texture mapping data from the texture mapping database onto the segment of the model to form at least one resultant image; and (i) displaying the resultant image.

Preferably, the actual data from the performance of the actual medical procedure is selected from the group consisting of video data, MRI (magnetic resonance imaging) data and CAT (computer assisted tomography) scan data.

More preferably, step (f) further comprises the steps of: (i) modeling the actual human organ as a plurality of polygons according to a spline; (ii) mapping the spline to the actual human organ according to three-dimensional coordinates; (iii) altering the spline such that the spline fits the actual data.

Most preferably, the texture mapping data further include animation. Also most preferably, the animation includes random movement of the actual medical instrument and random movement of the actual human organ.

According to still another embodiment of the present invention, there is provided a method for teaching a particular skill required for performance of an actual medical procedure to a student, the actual medical procedure being performed with an actual medical instrument on an actual organ with visual feedback, the method comprising the steps of: (a) providing a simulated instrument for simulating the actual medical instrument; (b) providing a simulated organ for simulating the actual organ; (c) abstracting a portion of the visual feedback of the actual medical procedure; (d) providing the portion of the visual feedback for simulating the visual feedback; and (e) manipulating the simulated instrument within the simulated organ by the student according to the portion of the visual feedback, such that a motion of the simulated instrument is the skill taught to the student.

Preferably, the portion of the visual feedback includes substantially fewer visual details than the visual feedback of the actual medical procedure.

More preferably, the simulated organ is a simulation of a gastro-intestinal tract, and the simulated instrument is a simulation of an endoscope.

Most preferably, the portion of the visual feedback includes only a geometrical shape of an interior of the gastrointestinal tract.

The method of the present invention for preparing a model of the simulated organ, and for rendering the visual feedback of the simulated organ during the simulated medical procedure, can be described as a plurality of instructions being performed by a data processor. As such, these instructions can be implemented in hardware, software or firmware, or a combination thereof. As software, the steps of the method of the present invention could be implemented in substantially any suitable programming language which could easily be selected by one of ordinary skill in the art, including but not limited to, C and C++.

Hereinafter, the term "simulated medical procedure" refers to the simulation of the medical procedure as performed through the system and method of the present invention. Hereinafter, the term "actual medical procedure" refers to the performance of the medical procedure on an actual, living human patient with an actual endoscope, such that the medical procedure is "real" rather than "simulated". Hereinafter, the term "corresponding actual organ" refers to the "real" organ of a human being or other mammal which is being simulated by the simulated organ of the present invention.

Hereinafter, the term "endoscopy" includes, but is not limited to, the procedure of flexible gastro-endoscopy, as previously described, and medical diagnostic and surgical procedures in which an endoscope is inserted into the mouth or the rectum of the subject for manipulation within the gastro-intestinal tract of the subject. Hereinafter, the term "subject" refers to the human or lower mammal upon which the method and system of the present invention are performed or operated. Hereinafter, the term "student" refers to any human using the system of the present invention, being trained according to the present invention or being taught according to the present invention including, but not limited to, students attending medical school or a university, a medical doctor, a trained gastro-enterologist or other trained medical specialist.

BRIEF DESCRIPTION OF THE DRAWINGS

The foregoing and other objects, aspects and advantages will be better understood from the following detailed description of a preferred embodiment of the invention with reference to the drawings, wherein.

BRIEF DESCRIPTION OF THE INVENTION

Figure 1:
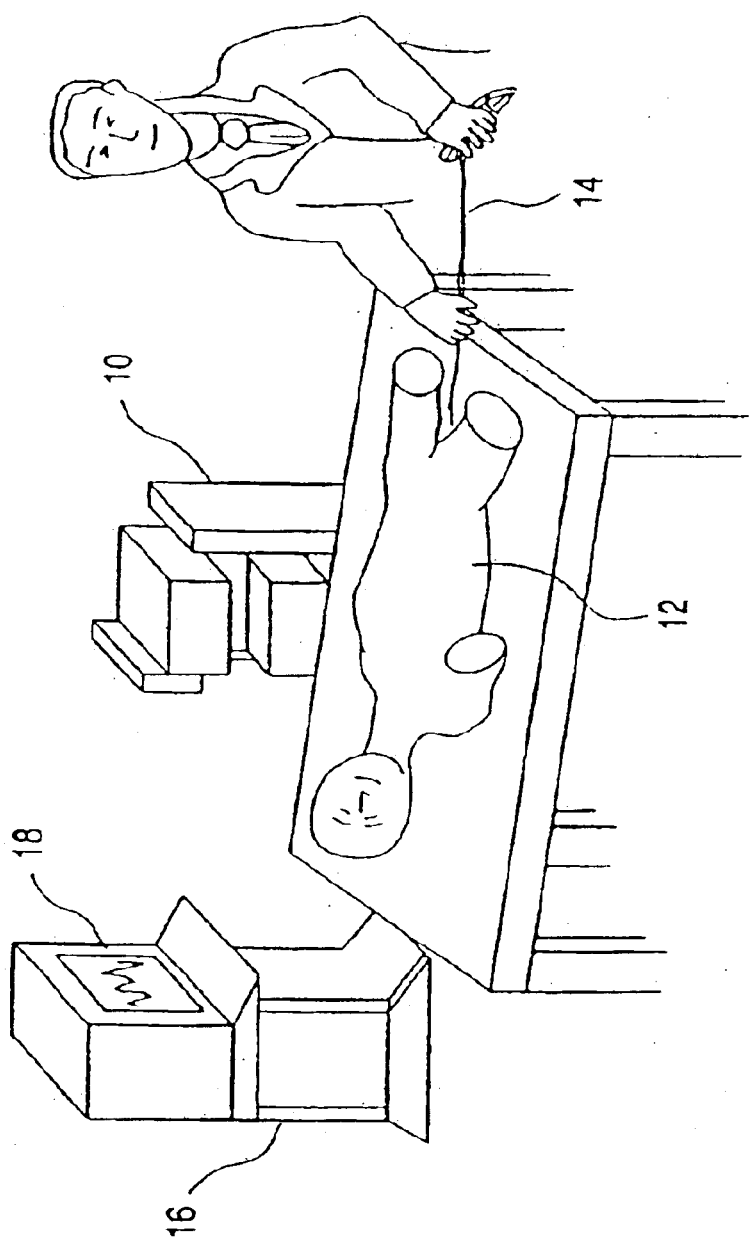
FIG. 1 is an exemplary illustration of the system for medical simulation according to the present invention.

The present invention includes a method and a system to simulate the medical procedure of endoscopy, particularly of flexible gastro-endoscopy. The system is designed to simulate the actual medical procedure of endoscopy as closely as possible by providing both a simulated medical instrument, and tactile and visual feedback as the simulated procedure is performed on the simulated patient. Although the discussion is directed toward the medical procedure of endoscopy, the present invention could also be employed to simulate other types of minimally invasive medical procedures.

The system of the present invention features both a physical model and a virtual model for the simulation of the medical procedure of endoscopy. The physical model includes a mannequin into which the simulated endoscope is inserted. A simulated organ is located within the mannequin. For example, if the simulated organ is the gastrointestinal tract, the organ may optionally include a simulated rectum and a simulated colon for simulating the procedure of flexible gastro-endoscopy. Optionally and preferably, the simulated organ may optionally include a simulated mouth and upper gastro-intestinal tract. The simulated endoscope is inserted into the simulated gastro-intestinal tract. The simulated gastro-intestinal tract includes a tactile feedback system for providing realistic tactile feedback according to the movement of the simulated endoscope within the simulated organ.

The virtual model provides a "virtual reality" for the simulation of images from the endoscope. In an actual endoscopic medical procedure, a camera at the tip of the actual endoscope returns images from the gastro-intestinal tract of the human patient. These images are then viewed by the physician performing the endoscopic procedure, thereby providing visual feedback to the physician. The system of the present invention provides a "virtual reality" for the realistic simulation of this visual feedback. This virtual reality enables the real-time display of realistic images of the gastro-intestinal tract on a video monitor according to the manipulations of the simulated endoscope, preferably in such a manner that the tactile and visual feedback are linked as they would be in a human patient.

The virtual reality has two main components: a three-dimensional, mathematical model of the gastrointestinal tract, or a portion thereof, and a database of enhanced digitized images derived from actual visual data obtained from actual endoscopic procedures. These two components are combined to provide realistic visual feedback by using the enhanced images as texture mapping to overlay the mathematical model of the simulated organ, thereby closely simulating images obtained from the actual procedure.

The virtual reality feedback of the gastro-intestinal tract is particularly advantageous for simulating images because it does not rely on video streams, which require massive computational power for real-time display of visual feedback. In addition, video streams provide only a predetermined flow of images and cannot provide visual data with six degrees of freedom in real time. Furthermore, the virtual reality of the present invention does not rely merely on a mathematical model of the gastrointestinal tract, which cannot capture the irregularities and subtle visual features of an actual gastrointestinal tract from a human patient. Thus, the virtual reality feedback of the gastrointestinal tract provides the best simulation of realistic images in real time for visual feedback.

DETAILED DESCRIPTION OF PREFERRED EMBODIMENTS

The present invention is related to a method and a system to simulate the procedure of endoscopy, particularly of flexible gastro-endoscopy. The system includes a mannequin into which the simulated endoscope is inserted. Visual feedback is provided through a video monitor, which displays realistic images in real time, according to the manipulations of the simulated endoscope. Realistic tactile feedback is also provided, preferably in such a manner that the tactile and visual feedback are linked as they would be in a human patient. Preferably, the present invention also features a tutorial system for training students and testing their performance. Thus, the system and method of the present invention provide a realistic simulation of the medical procedure of endoscopy for training and testing students.

The principles and operation of a method and a system according to the present invention for medical simulation, and in particular for the simulation of the medical procedure of endoscopy, preferably including communicating tutorial results and measurement of student skills to the teacher or supervising medical personnel, may be better understood with reference to the drawings and the accompanying description, it being understood that these drawings are given for illustrative purposes only and are not meant to be limiting. Furthermore, although the description below is directed toward the simulation of the colon, it should be noted that this is only for the purposes of clarity and is not meant to be limiting in any way.

Referring now to the drawings, FIG. 1 depicts an exemplary, illustrative system for medical simulation according to the present invention. A system 10 includes a mannequin 12 representing the subject on which the procedure is to be performed, a simulated endoscope 14 and a computer 16 with a video monitor 18. A student 20 is shown interacting with system 10 by manipulating simulated endoscope 14 within mannequin 12. As further illustrated in FIGS. 5A and 5B below, mannequin 12 includes a simulated organ into which simulated endoscope 14 is inserted. As student 20 manipulates simulated endoscope 14, tactile and visual feedback are determined according to the position of endoscope 14 within the simulated organ (not shown). The visual feedback are provided in the form of a display on video monitor 18. The necessary data calculations are performed by computer 16, so that realistic tactile and visual feedback are provided to student 20.

Figure 2:
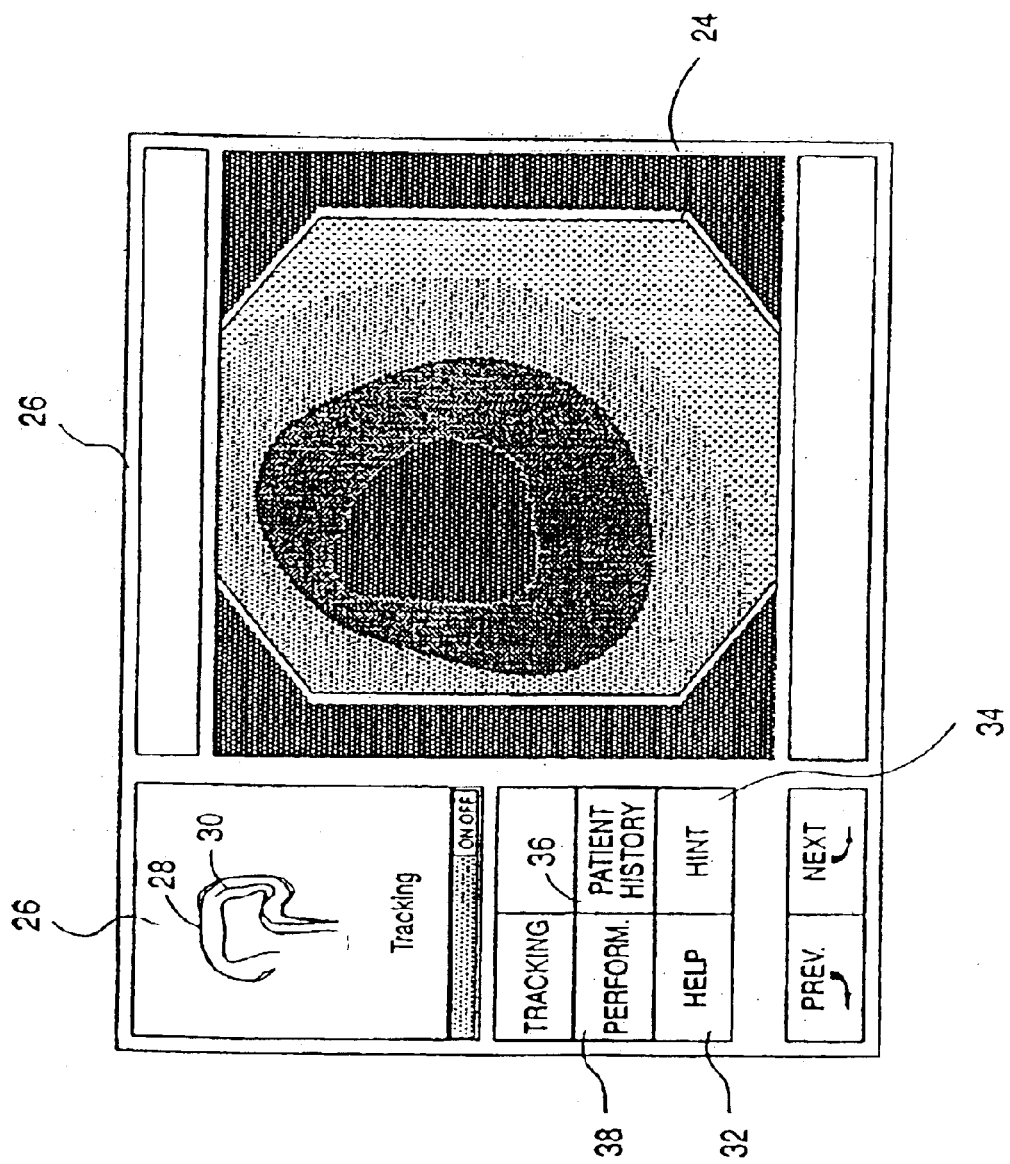
FIG. 2 is an exemplary illustration of a screen display according to the present invention.

FIG. 2 is an exemplary illustration of a screen display shown on monitor 18. A screen display 22 includes a feedback image 24. Feedback image 24 represents the visual image as seen if the endoscope were inserted into a living human patient. Feedback image 24 is an accurate and realistic simulation of the visual data that would be received from that portion of the gastrointestinal tract in the living human patient. Although feedback image 24 is shown as a static image, it is understood that this is for illustrative purposes only and the actual visual feedback data would be in the form of a substantially continuous flow of simulated images based upon actual video stream data obtained from an actual endoscopic procedure. Thus, the flow of images represented by feedback image 24 gives the student (not shown) realistic visual feedback.

In addition, screen display 22 preferably includes a number of GUI (graphic user interface) features related to the preferred tutorial functions of the present invention. For example, a tracking display 26 explicitly shows the location of the simulated endoscope within the simulated gastrointestinal tract. Tracking display 26 includes a schematic gastrointestinal tract 28, into which a schematic endoscope 30 has been inserted. Preferably, tracking display 26 can be enabled or disabled, so that the student can only see tracking display 26 if the tracking function is enabled.

Additional, optional but preferred features of screen display 22 include the provision of a "help" button 32, which upon activation could cause the display of such helpful information as a guide to the controls of the endoscope. Similarly, a preferred "hint" button 34 would give the student one or more suggestions on how to continue the performance of the medical procedure. A preferred "patient history" button 36 would cause screen display 22 to show information related to one of a selection of simulated "patient histories", which could be of help to the student in deciding upon a further action. Finally, a preferred "performance" button 38 would cause screen display 22 to display a review and rating of the performance of the student. All of these functions are part of the preferred embodiment of a tutorial system for training a student in the medical procedure of endoscopy, as described in further detail in FIG. 4.

Figure 3A:
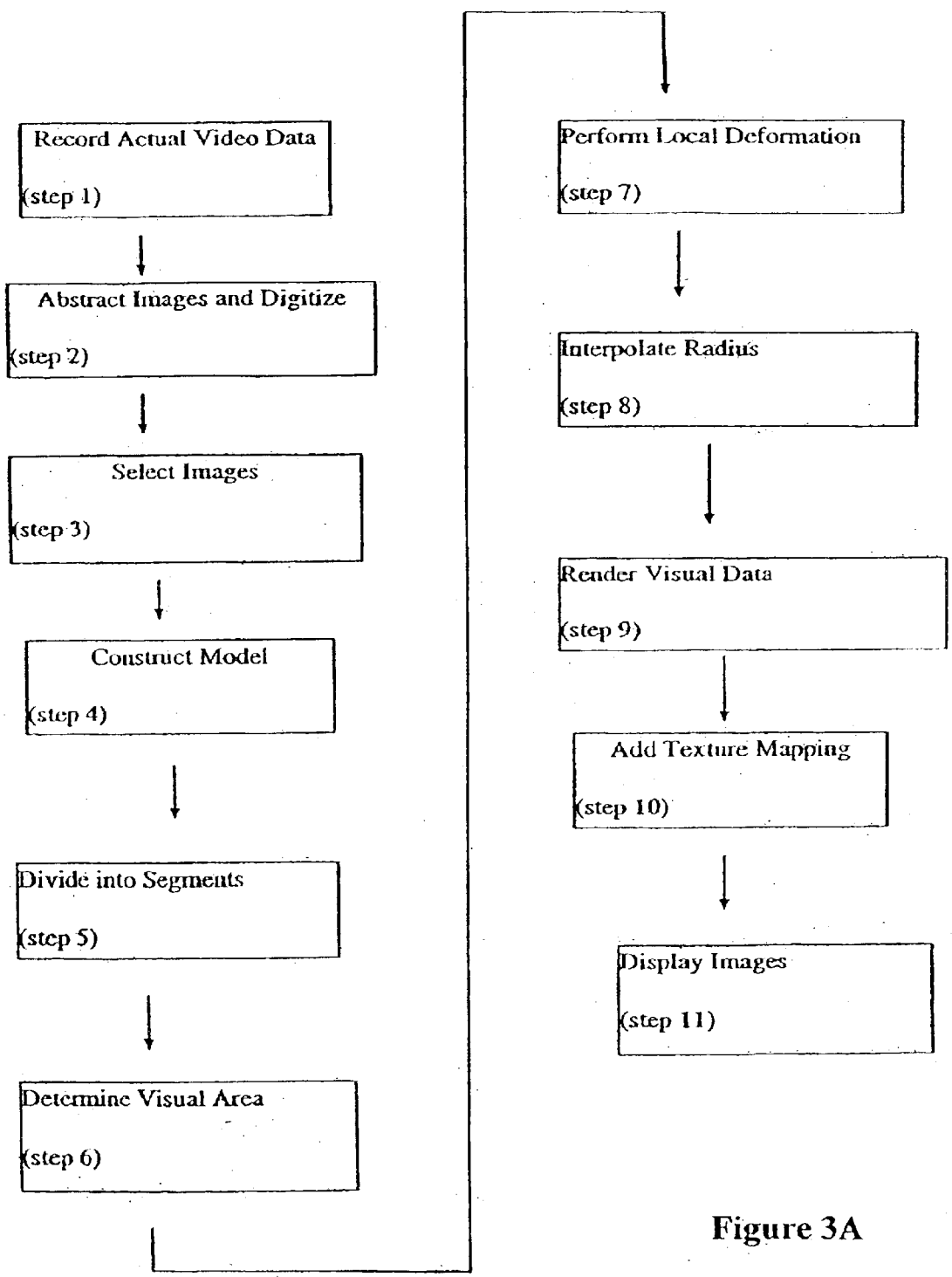
FIG. 3A is a flowchart of an exemplary method according to the present invention for preparation of the visual model of the simulated organ and rendering of visual feedback and FIG. 3B is a schematic block diagram of an exemplary visual processing and display system according to the present invention.
Figure 3B:
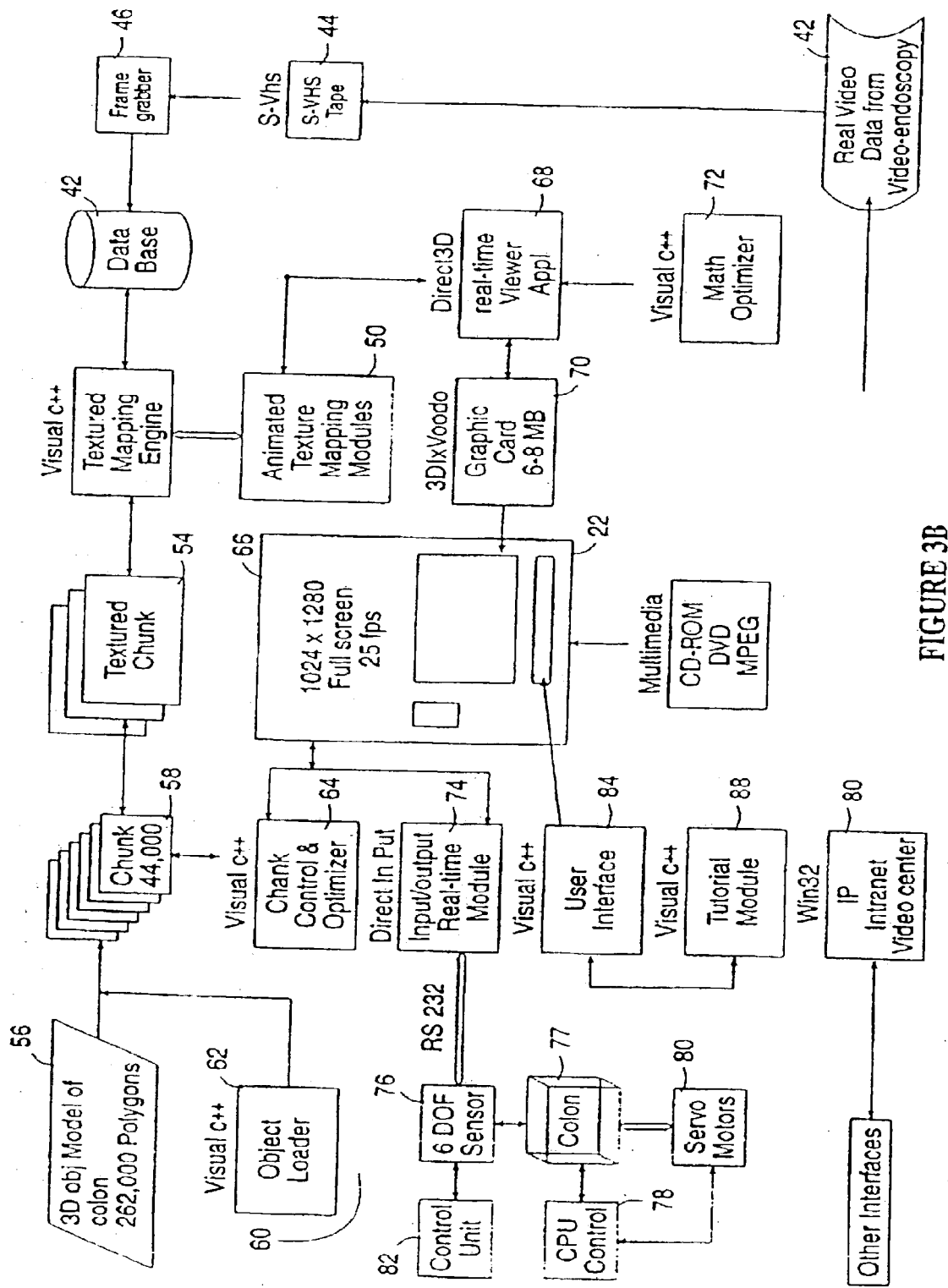

FIGS. 3A and 3B are schematic block diagrams of an exemplary visual processing and display system and method according to the present invention. FIG. 3A is a flow chart of the method for visual processing and display according to the present invention, and is intended as a summary of the method employed by the system of FIG. 3B. Further details concerning particular aspects of the method are described below with reference to FIG. 3B.

The method and system of the present invention provide a solution to a number of problems in the art of medical simulation, in particular for the simulation of the procedure of gastro-endoscopy. This procedure involves the visual display of an interior portion of the gastrointestinal tract, such as the colon. The colon is a flexible body with a curved structure. The inner surface of the colon is generally deformable, as well as being specifically, locally deformable. All of these deformations in space must be calculated according to the mathematical model of the colon, and then rendered visually in real time in order to provide a realistic visual feedback response for the user.

FIG. 3A shows a preferred embodiment of the method of the present invention for preparation of the model and rendering of visual feedback, including steps required for preparation of the computerized model of the colon, as well as steps required for display of the colon.

In step 1 of the method of the present invention, actual video data are recorded onto videotape during the performance of the actual medical procedure of endoscopy on a living human patient. In addition, such data could also include MRI (magnetic resonance imaging) and CAT (computer assisted tomography) scan data from procedures performed on living human patients.

In step 2, individual images are abstracted, for example with a framegrabber device, and then digitized. In step 3, the digitized images are preferably selected for clarity and lack of visual artifacts, and are then stored in a texture mapping database. More preferably, the digitized images are enhanced before being stored. Most preferably, the texture mapping also include animation. Such animation could simulate effects such as random vibration of the tissue of the colon or of the endoscope, as well as such events as liquid flowing downward due to the influence of gravity.

In step 4, a three-dimensional mathematical model of the human colon is constructed. The three-dimensional mathematical model of the colon which is particularly preferred for the present invention is a polygonal model such as a spline. This mathematical function represents the colon as a series of curves, such that the points in the three-dimensional structure of the colon are mapped to the spline. For example, the colon could be modeled as a straight line which is deformed by altering the spline for the model until the model fits the data. Alternatively, the spline could be placed inside the colon and mapped to the colon. Preferably, multiple splines are used to model the junction of the stomach and small intestine, for example.

The mapping can be performed according to three-dimensional coordinates, along the x, y and z axes. Alternatively, the mapping can be performed according to coordinates of time, angle and radius within the colon. A mixture of these two different types of coordinates is also optionally employed, in which the coordinates are time, x and y for example. Both the spline itself and the mapping from the spline to the colon can optionally be altered in order to provide new and different visual representations of the colon, for example in order to provide a plurality of theoretical "test cases" for students to study. The alteration is optionally performed according to MRI (magnetic resonance imaging) data, for example. In addition, optionally and preferably data from MRI and/or CAT scan procedures are cleaned and reassembled according to the mathematical model, in order to more accurately determine the geometry of the simulated colon. Substantially all of these procedures could be performed automatically according to such data or alternatively, these procedures could also be performed partially or wholly manually. Thus, the preferred mathematical model of the present invention permits the data to be rapidly visually rendered onto the model of the colon.

According to a particularly preferred embodiment of the present invention, a "loop" of the endoscope cable itself is modeled. Such a loop occurs when the person performing the endoscopic procedure, whether "real" or simulated, inadvertently changes direction within the colon by turning the endoscope itself. Such a loop can be very dangerous to the patient, and therefore should be detected as part of a simulation, in order to warn the student as an indication that the procedure has been performed incorrectly thereby causing the loop to appear.

Preferably, the loop is constructed with a spline according to the present invention and is coordinated with force feedback. The length of cable which has been fed into colon must be determined, as must the length of the colon from the rectum (entry point of the endoscope) to the current position of the endoscope. The size of the loop is then calculated from the differential of these two lengths, and the loop is modeled according to the spline.

The method of visually rendering the colon according to the present invention includes a number of steps, described below, which are performed as software instructions operated by a data processor. The method preferably includes the step (shown as step 5 in FIG. 3A) of dividing the colon into a plurality of portions. The division is made linearly, since the spatial movement of the simulated endoscope is limited. In other words, the simulated endoscope cannot "jump" from one portion of the colon to another, but must instead proceed in a linear fashion along the simulated colon. In addition, the simulated endoscope can only be moved at a finite speed through the simulated colon. Thus, the endoscope must pass through each segment of the three-dimensional model of the colon in sequence at a known, limited speed.

The consequences of such a division is that only one segment needs to be processed in any given moment, although a plurality of such segments could be processed substantially simultaneously if the computing resources were available. Furthermore, the division reduces the visual processing into a much more manageable task, since this model may optionally include thousands of polygons in the preferred embodiment, although each segment has far fewer polygons.

In addition, preferably only those portions which are in the line of sight of the camera, and hence either immediately visible or soon to become visible, are selected for visual rendering in order to decrease the computations required for the rendering. More preferably, the number of portions which are rendered is not predetermined, since under certain circumstances, the number of portions in the line of sight may vary. For example, when the camera is traveling around a bend in the colon, the line of sight of the camera is very short, such that relatively fewer portions, or else smaller such portions, must be rendered.

Next, in step 6, the visual attributes of the area of the colon being scanned by the camera are determined. Preferably, these visual attributes are determined according to a number of factors, including the location of the tip of the endoscope, which holds the camera, and the direction in which the camera itself is pointed. Other important factors include the shape of the colon being modeled and the history of movement of the camera through the colon. With regard to the latter factor, the previous movements of the endoscope through the colon, as determined by the actions of the student, have a significant impact on the area of the colon which is visualized by the camera at any given moment. For example, if the student has caused a "loop" to form by incorrectly operating the endoscope, as previously described, this "loop" can be simulated correctly only through the inclusion of the history of movements to determine the visual feedback.

In step 7, preferably a local deformation to at least one of these portions is analyzed to determine if such a deformation affects the spline itself. The mapped coordinates are then rapidly transformed from time, angle and radius to x, y and z. Next, in step 8 preferably the local deformation of the tissue of the colon is determined through interpolation of the radius, in order to determine the degree of such deformation. Since the time, angle and radius may not give sufficient information to perform this calculation, optionally and preferably, the volume of the colon is additionally altered according to predefined mathematical models.

For deformations on a highly local scale, such as the point of contact between the tip of the endoscopic instrument and the colon at a low degree of force from the instrument, preferably the level of details in the area is increased by adding more polygons to the calculations performed with the model in order to be able to stretch all or substantially points in the immediate area without distortion. The stretching is preferably performed according to a predetermined function which preferably enables the spline model to be altered locally.

This preferred method for modeling "stretching" of the colon can also be used to model local areas of irregularity such as a polyp. Polyps can be mapped point by point onto the model of the colon, thereby adjusting the visual representation of the tissue to accommodate both the polyp itself and the structural alterations of the tissue at the base of the polyp.

Next, in step 9, the various types of data which were previously described are used to actually render the visual data onto the colon. Initially, the mapping of such data onto the model optionally and preferably involves some adjustments, performed manually by a software programmer. Alternatively, such mapping could be entirely automatically performed.

In step 10, texture mapping from the database is overlaid onto the chunk of the model. Preferably, such texture mapping includes both the digitized images and additional animation. In step 11, the resultant images are displayed. As noted previously, the images are displayed in a continuous flow according to the location of the simulated endoscope within the simulated gastrointestinal tract. Also as noted previously, such mapping of coordinates is preferably performed according to the mathematical model of the colon, which is more preferably a spline.

FIG. 3B shows the visual processing and display system according to the present invention in more detail. A visual processing and display system 40 includes screen display 22 for displaying the processed visual data. The visual data are constructed as follows. First, data are recorded from actual gastro-endoscopic procedures onto videotape, as shown in a recording block 42. The data are preferably stored on Super-VHF videotape in order to obtain the highest quality representation of the visual images displayed on the screen during the actual endoscopic procedure, as shown in block 44. Next, at least a portion of the frames of the videotape, and preferably substantially all the frames, are abstracted individually by a frame-grabber 46 to form digitized images. Individual digitized images can then be selected for clarity and lack of artifacts such as reflections from the endoscopic apparatus itself. The images in the selected frames are then preferably enhanced and added to a texture mapping database 48.

Preferably, two types of texture mapping are stored in the database. The first type of texture mapping is intended to enhance the realistic visual aspects of the images, for example by removing visual artifacts. The second type of texture mapping is intended to simulate the behavior of a live organ and a real endoscope, as represented by block 50. During actual endoscopic procedures on a living human patient, the tissue of the colon moves somewhat, and the endoscope itself vibrates and wobbles. This movement is simulated visually by the addition of random animation of the images, and also by the addition of such effects as liquid flowing downward due to the influence of gravity. Such animation enhances the realistic nature of the visual representation of the colon.

In order for the enhanced images to be correctly displayed, the images must correspond to the manipulation and location of the simulated endoscope within the simulated colon. In particular, the texture mapping of the images should correspond to the location of the endoscope within the colon. Such correspondence between the location of the endoscope within the colon and the texture mapping is provided by a texture mapping engine 52. The texture mapping data is then readily accessed by the display portion of visual system 40, as shown by block 54.

However, as noted for previous prior art devices, simply reproducing the selected enhanced frames in a massive video stream would quickly overwhelm the computational resources and cause the visual display to become unsynchronized from the physical location of the simulated endoscope. Furthermore, such a video stream would not enable the correct display of images according to the movement of the endoscope, which preferably has six degrees of freedom. Thus, mere reproduction is not sufficient to ensure realistic images, even when mapped onto a three-dimensional surface.

Preferably, visual processing and display system 40 includes a three-dimensional mathematical model of at least a portion of the gastro-intestinal tract 56, more preferably constructed as described in FIG. 3A. For the purposes of discussion, model 56 is herein described as a three-dimensional model of the colon, it being understood that this is not meant to be limiting in any way. Model 56 preferably features a plurality of segments 58, more preferably many such segments 58.

As the simulated endoscope moves along the simulated colon, the location of the endoscope is given to a locator 60, described in further detail below. Locator 60 then instructs an object loader 62 to load the relevant segment 58 for access by visual system 40, as shown in block 54 and previously described. In the preferred embodiment shown, preferably three segments 58 are ready for access by object loader 62 at any given moment. The specific segment 58 in which the endoscope is currently located is preferably held in DRAM or RAM, in combination with the texture mapping described previously. The next segment 58 and the preceding segment 58 preferably are also stored in an easily accessible location, although not necessarily in RAM or DRAM.

Preferably, the display of each image from specific segment 58 into which the simulated endoscope has entered is optimized by a segment optimizer 64. Segment optimizer 64 receives information from locator 60, as well as the series of images obtained from overlaying the texture mapping onto the relevant segment 58, and then feeds each specific image to a display manager 66 for display on screen display 22.

In addition, display manager 66 is assisted by a real-time viewer 68, preferably implemented in Direct 3D™ (Microsoft Inc., Seattle, Wash.). Real-time viewer 68 provides the necessary software support to communicate with a graphics card 70 for actual display of the images on screen display 22. Although graphics card 70 can be of any suitable manufacture, preferably graphics card 70 has at least 8, and more preferably at least 16, Mb of VRAM for optimal performance. An example of a suitable graphics card 70 is the 3Dfx Voodoo Rush™ card. Preferably, the performance of real-time viewer 68 is enhanced by a math optimizer 72, preferably implemented in Visual C++. The interaction between segment optimizer 64 and display manager 66 on the one hand, and locator 60 on the other, is provided through a software interface 74. Software interface 74 enables locator 60 to communicate with the other components of visual system 40, in order to provide information regarding the location of the endoscope within the colon.

In preferred embodiments of the present invention, locator 60 includes a sensor 76, which can be obtained from Ascension Technology Corp., for example. Sensor 76 senses positional information from within a simulated organ 77, which is described herein as a colon for the purposes of discussion and is not meant to be limiting. Sensor 76 is controlled by a control unit 82. The positional information is then relayed to a CPU controller 78, which is connected to a servo-motor 80 (Haydon Switch and Instrument Co.). As the simulated endoscope moves through the colon, the endoscope contacts different portions of the colon (not shown; see FIGS. 5 and 6 below). Tactile feedback is provided by each servo-motor 80 in turn, which manipulates the material of the colon.

All Visual system 40 also includes a user interface 84, preferably implemented in Visual C++. User interface 84 includes the GUI features described previously for FIG. 2. In addition, user interface 84 enables visual system 40 to interact with the preferred feature of a network interface 86, for example, so that other students can view screen display 22 over a network. User interface 84 also permits the tutorial functions of at least one, and preferably a plurality of, tutorial modules 88 to be activated. Tutorial module 88 could include a particular scenario, such as a subject with colon cancer, so that different types of diagnostic and medical challenges could be presented to the student. The student would then need to respond correctly to the presented scenario.

Figure 4:
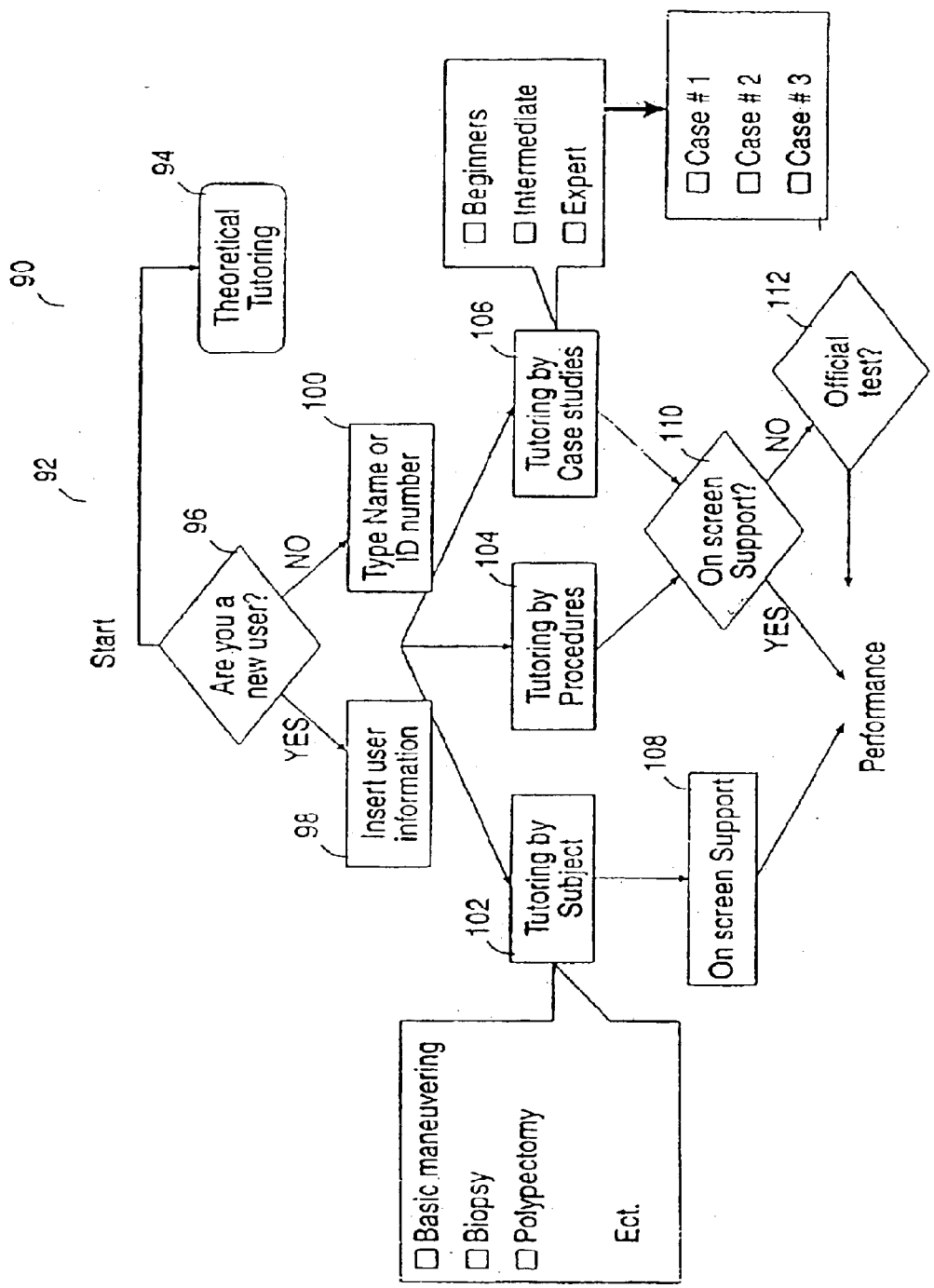
FIG. 4 is a schematic block diagram of an exemplary tutorial system according to the present invention.

An example of the tutorial system is illustrated in more detail in the block diagram of FIG. 4. A tutorial system 90 starts as shown in block 92. Next, the user must select whether actual interaction with the simulated endoscope is desired, or if the user prefers to receive tutoring in the theory of endoscopy, as shown in a block 94. The next display asks if the user is new, as shown in a block 96. If the answer is "yes", the user is requested to enter certain information, as shown by block 98. If the answer is "no", the user is requested to enter identification information, such as user name or identification number, as shown in block 100.

Next, the user must select the type of tutoring. For example, the user could select tutoring by subject 102, tutoring by procedures 104 or tutoring by case studies 106. Tutoring by subject 102 includes, but is not limited to, such subjects as basic manipulation of the endoscope, biopsy and polypectomy. Tutoring by subject 102 includes on-screen support, as shown in block 108.

Tutoring by case studies 106 can be selected both according to case number and according to the level of the desired cases, such as beginner, intermediate and expert. Preferably, individual case studies could be created by a teacher or professor, by combining features of various stored cases. For example, a professor could create a case history appropriate for a 20 year old male with colitis, so that the student would then be able to practice endoscopy on such a patient. Thus, tutoring system 90 preferably has the flexibility to enable many different types of "patients" to be studied.

If desired, on-screen support can be provided for both tutoring by case studies 106 and tutoring by procedures 104, as shown in block 110. If on-screen support is not desired, the user can indicate whether the tutoring session is actually an official test, as shown in block 112. Thus, tutoring system 90 includes both the ability to teach and the ability to test the student.

According to a preferred embodiment of the present invention, the tutorial system also includes a simplified version of the simulated endoscopic process for teaching the proper manipulation of the endoscope according to visual feedback, as well as for enabling the student to understand the correspondence between the visual feedback and tactile feedback. This simplified version would emphasize the performance and mastery of one or more specific tasks, such as the manipulation of the endoscope through the colon.

Indeed, this preferred embodiment could be generalized to a method for teaching a particular skill required for performance of an actual medical procedure to a student. This method would include the step of abstracting a portion of the visual feedback of the actual medical procedure, which would preferably include fewer visual details than the entirety of the visual feedback obtained during the performance of the medical procedure. This portion of the visual feedback would preferably enable the student to learn the motion of the instrument as the required skill.

For example, the simplified version may optionally not feature many, or even most, of the visual details of the colon as visual feedback. Instead, the colon would preferably be presented as a smooth, relatively featureless tube having the geometry and dimensions of the colon in order to correlate the motion of the simulated endoscope through the interior space of the colon. More preferably, the simplified version would be embodied as a game, in which students would be awarded points for correct manipulation of the endoscope, and would be penalized for incorrect manipulations. Thus, the student would have the opportunity to learn the manipulations required for successful endoscopy without the distraction of visual details, in a low pressure and even "fun" environment.

Figure 5A:
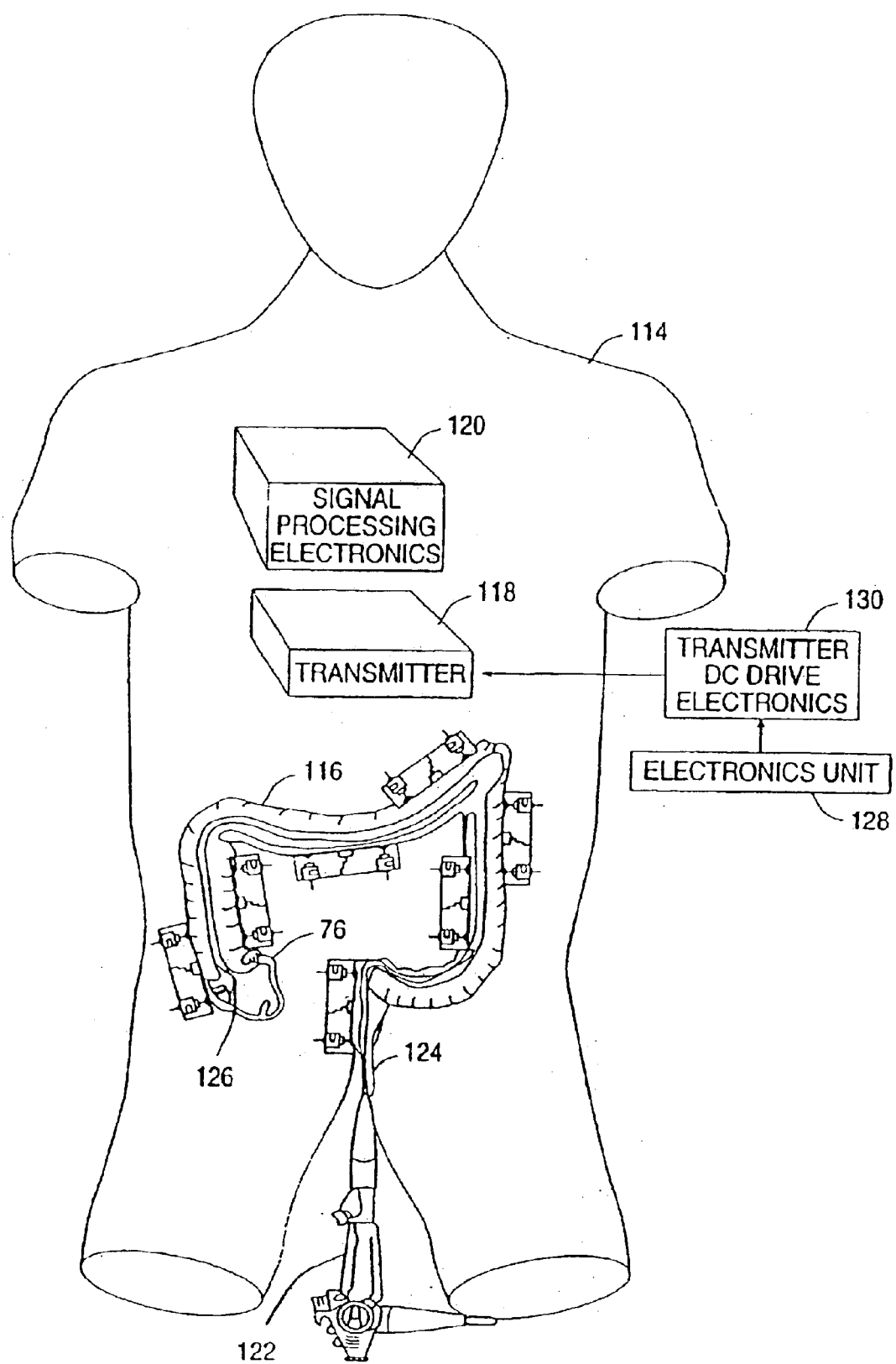
FIGS. 5A and 5B illustrate an exemplary simulated gastro-intestinal tract according to the present invention.
Figure 5B:
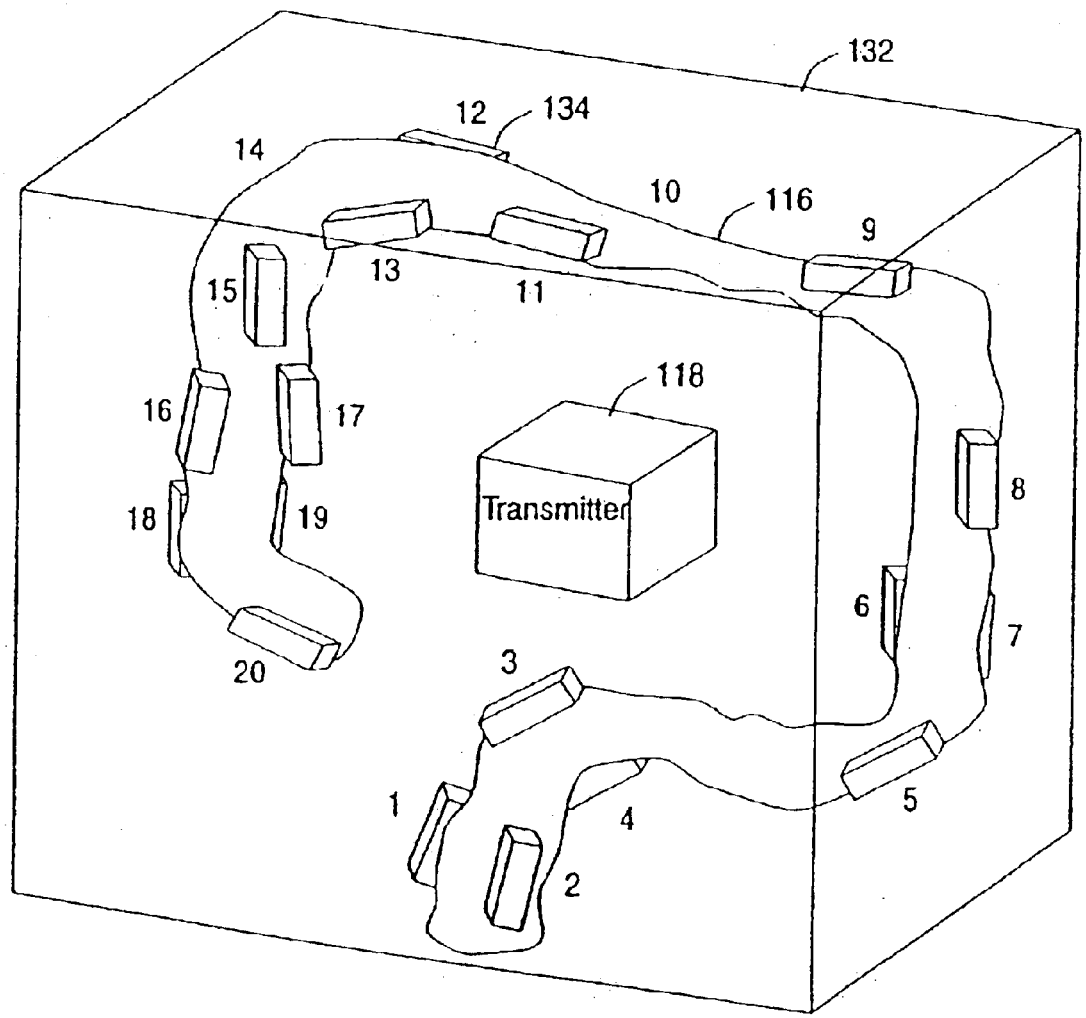

FIGS. 5A and 5B illustrate the mechanical aspects of an exemplary simulated gastro-intestinal tract according to the present invention. A cut-away view of a mannequin 114 is shown in FIG. 5A. Preferably, mannequin 114 is about one meter wide, which is within the dimensions of an actual human subject. A simulated gastro-intestinal tract 116 is shown within mannequin 114. For the purposes of clarity, simulated gastrointestinal tract 116 includes only the colon, it being understood that this is not meant to be limiting in any way. Simulated gastro-intestinal tract 116 is connected to a transmitter 118 and a signal processing device 120, also placed within mannequin 114. As shown, a simulated endoscope 122 can be inserted into mannequin 114 through an opening 124. In this case, since the simulation is for endoscopy of the colon of the subject, opening 124 simulates the rectum of the subject.

Simulated endoscope 122 can be maneuvered left, right, up and down. Preferably, simulated endoscope 122 is about 1800 cm long, similar to the length of a real endoscope. Also preferably, the diameter of the tip of simulated endoscope 122 is about 13.4 mm, while the remainder of endoscope 122 has a diameter of about 10.2 mm, again similar to the dimensions of a real endoscope.

Once simulated endoscope 122 is inserted into simulated gastro-intestinal tract 116, sensor 76 on the tip of simulated endoscope 122 is able to detect the location of simulated endoscope 122. Sensor 76 preferably has three degrees of freedom, more preferably six degrees of freedom for effective simulation of manipulation of endoscope 122. If sensor 76 has six degrees of freedom, the detected directions of orientation include the Cartesian coordinates X, Y, Z, as well as roll, elevation and azimuth. In addition, sensor 76 preferably includes a sensor transmitter 126, so that the precise angle and location of sensor 76 can be determined relative to gastrointestinal tract 116. Sensor transmitter 126 transmits data to signal processing device 120, which then analyzes and processes the signal. The processed signal is then given to transmitter 118 for transmission to an electronics unit 128 and a DC drive unit 130. The signal is converted by DC drive unit 130 and passed to electronics unit 128. Electronics unit 128 then sends the position and orientation of sensor 76 to software interface 74, so that the remainder of the display system is able to use the information to display the correct images on display screen 22 for visual feedback.

Figure 6A:
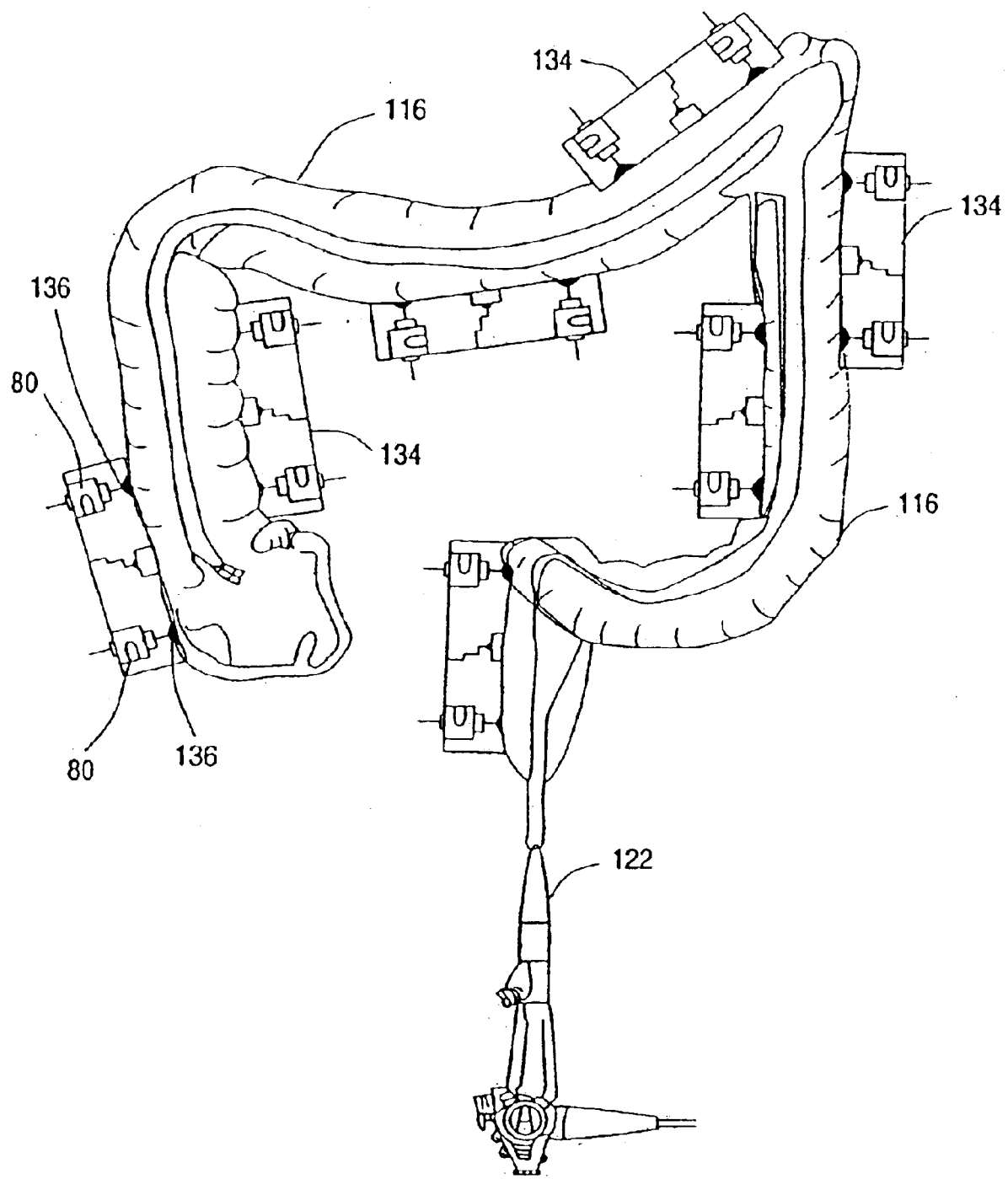
FIGS. 6A–C illustrate various aspects of one embodiment of the force-feedback system according to the present invention.
Figure 6B:
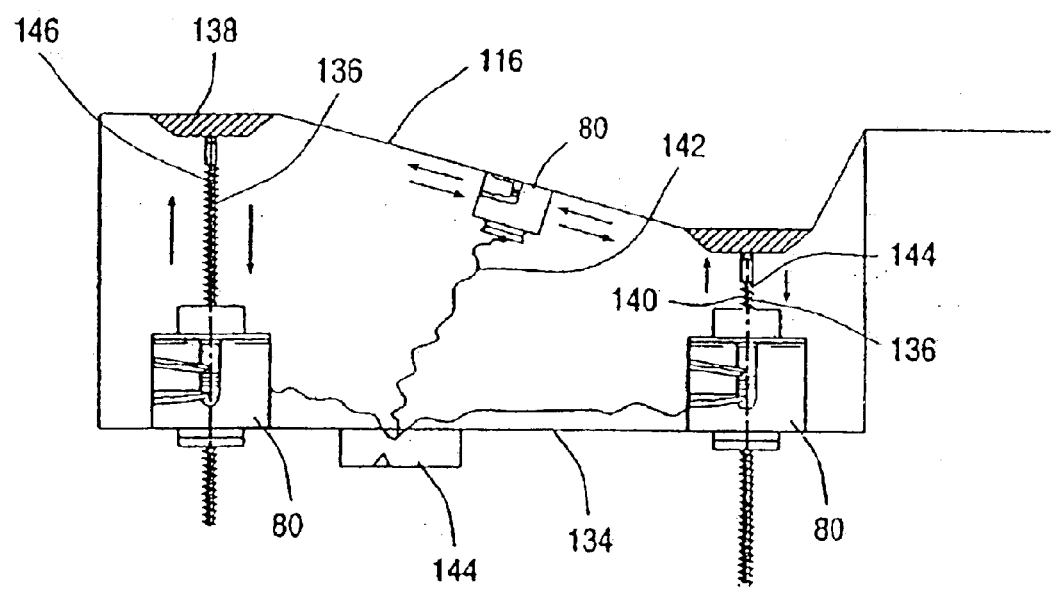
Figure 6C:
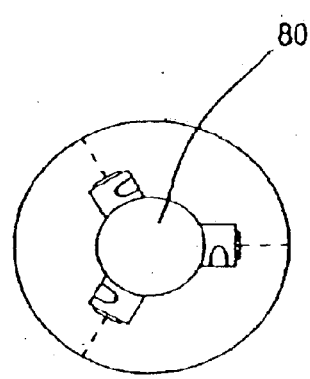

The present invention provides both visual feedback and tactile feedback. Tactile feedback can be provided through the exertion of forces on simulated endoscope 122 by simulated gastro-intestinal tract 116, as shown in FIGS. 6A–6C. Alternatively, tactile feedback could be provided by the mechanical action of simulated endoscope 122, as shown in FIGS. 7A–7D. For the first embodiment, preferably simulated gastro-intestinal tract 116 is constructed from semi-flexible material, which gives the feel of a smooth and wet material. Of course, the actual sensations of sliding along a semi-flexible, smooth, wet material can also be provided through the mechanism of endoscope 122 itself, as in the second embodiment.

An additional embodiment of gastro-intestinal tract 116, in which tract 116 is placed within a box 132 rather than within mannequin 114, is shown in FIG. 5B. The advantage of box 132 is that box 132 could serve to contain any radiowaves, so that the mechanism of gastro-intestinal tract 116 could be controlled by transmission of radiowaves, for example. Since certain medical equipment is highly sensitive to these radiowaves, they would need to remain within mannequin 114. Box 132 would therefore act to insulate gastro-intestinal tract 116 from the external environment outside the mannequin. Details of gastrointestinal tract 116 are more readily seen in FIG. 6A, it being understood that FIGS. 5A, 5B and 6A illustrate the same gastrointestinal tract 116.

FIG. 6A shows gastro-intestinal tract 116 according to the first embodiment, in which tactile feedback is provided by forces acting on simulated endoscope 122 by a mechanism contained within gastrointestinal tract 116 itself. Simulated gastro-intestinal tract 116 is made from a semi-flexible material. A plurality of motion boxes 134 are disposed at intervals along the outer surface of gastro-intestinal tract 116. For the purposes of illustration, seven motion boxes 134 are shown. Each motion box 134, shown in greater detail in FIG. 6B, has at least one, and preferably a plurality of, servo-motors 80, preferably linear motors.

Each servo-motor 80 is connected to a piston 136. The detail of piston 136 is shown enlarged in FIG. 6B. Each piston 136 is connected to a foot 138, which contacts a portion of the material of the external surface of gastrointestinal tract 116. Preferably, foot 138 is actually attached to the portion of the material of the external surface, for easier manipulation of the material.

Preferably, there are two different types of pistons 136. The first type, of which two are shown for illustrative purposes, is a vertical force piston 140 for causing vertical movement of a portion of the external surface of gastro-intestinal tract 116. The second type, of which one is shown for illustrative purposes, is a horizontal force piston 142 for causing horizontal movement of a portion of the external surface of gastro-intestinal tract 116. In the preferred embodiment shown, servomotor 80 is an oscillating motor placed directly against the material of gastro-intestinal tract 116, so that horizontal force piston 142 includes the motor alone, without a structure similar to vertical force piston 140. Since each piston 136 has an associated servo-motor 80, the necessary vertical and horizontal movement of the external surface of gastro-intestinal tract 116 can be precisely determined by the activity of servo-motor 80.

Each piston 136, or preferably attached foot 138, contacts the material of gastro-intestinal tract 116 in order to manipulate this material to exert a force against the endoscope (not shown). For example, as shown in FIG. 6B, a first vertical force piston 144 could be moved closer to servo-motor 80, while a second vertical force piston 146 is moved away from servo-motor 80. These movements alter the position of the material of gastro-intestinal tract 116, causing forces to be exerted against the simulated endoscope similar or identical to those felt during an actual endoscopic procedure. In addition, horizontal force piston 142, which is preferably an oscillating servo-motor alone as shown, moves horizontally to provide more delicate fine-tuning of the tactile feedback sensations. Since servo-motors 80 are disposed over the three-dimensional surface of gastrointestinal tract 116, the force on the endoscope can be exerted in three dimensions.

The activity of servo-motor 80 is in turn controlled by digital controller 82. Digital controller 82 can be a card inserted within the PC computer which is performing the requisite calculations required for the simulation of the medical process. Software operated by the PC computer uses positional and orientation information from sensor 76 on simulated endoscope 122 to determine the position of simulated endoscope 122. Next, the software sends instructions to digital controller 82 according to the desired tactile sensations which should be felt by the operator of simulated endoscope 122 at that particular position within simulated gastrointestinal tract 116. Digital controller 82 then causes at least one servo-motor 80 to move the associated piston 136 as necessary to provide the tactile feedback sensations.

Digital controller 82 can be connected to servo-motors 80 through some type of radiation, such as infra-red light. However, the limitations on radiation of certain wavelengths, such as radiowaves, within the hospital or medical environment, make a connection by an actual wire running from digital controller 82 to each servo-motor 80 more preferable. In the exemplary embodiment shown in FIG. 6B, each servo-motor 80 is connected to a motion box controller 144 by a wire. Motion box controller 144 is then preferably connected to digital controller 82 by a single wire (not shown). This configuration limits the number of individual connections made to digital controller 82 for greater efficiency.

FIG. 6C shows an enlarged cut-away view of servo-motor 80, which as noted previously is preferably a linear motor. Preferably, servo-motor 80 is about 100 mm wide and 45 mm tall.

FIGS. 7A–7D show a second embodiment of the mechanism for providing tactile feedback. In this embodiment, the mechanism is contained within the simulated endoscope itself, rather than the simulated gastrointestinal tract. Similar to the previous embodiment, the simulated gastrointestinal tract could be contained within a substantially life-size mannequin with an opening for simulating the rectum. Furthermore, from the viewpoint of the student or other individual operating the simulated endoscope, both embodiments should give a suitable simulation of the medical procedure. However, as detailed below, the actual mechanism of providing the tactile portion of the simulation differs.

Figure 7A:
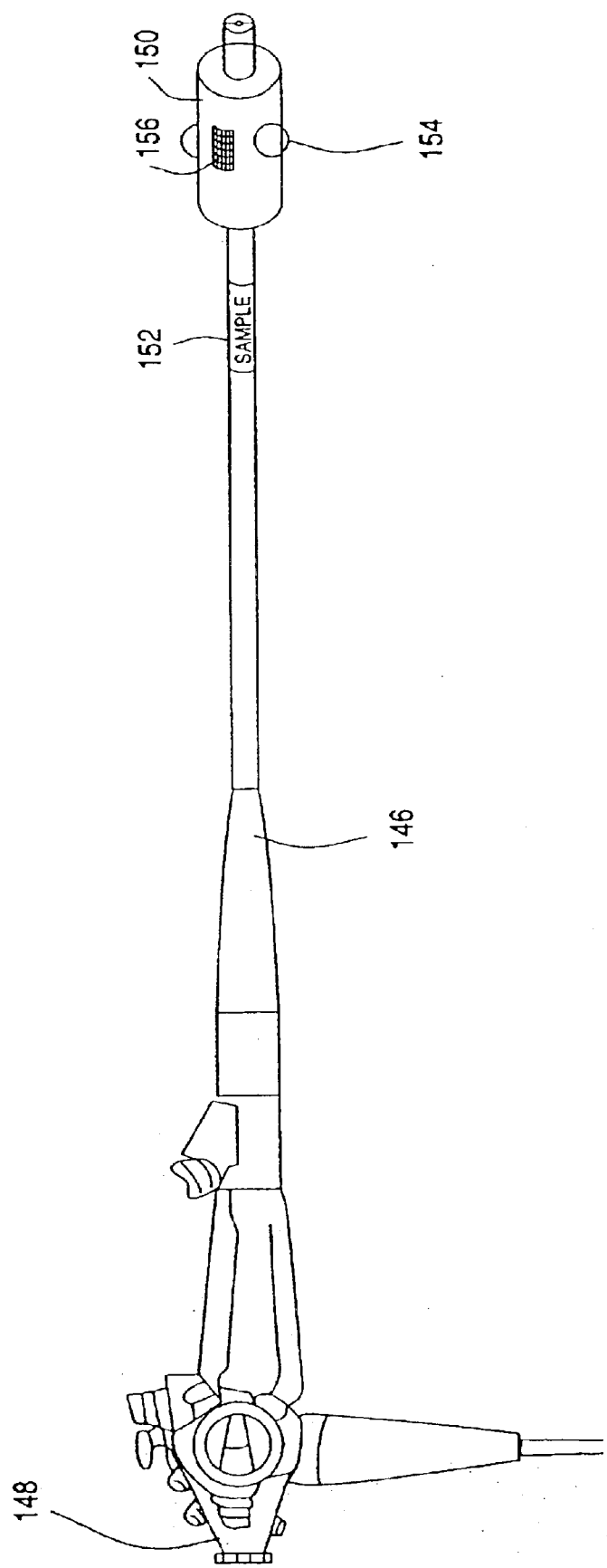
FIGS. 7A–7D illustrate a second embodiment of the force-feedback system according to the present invention.
Figure 7B:
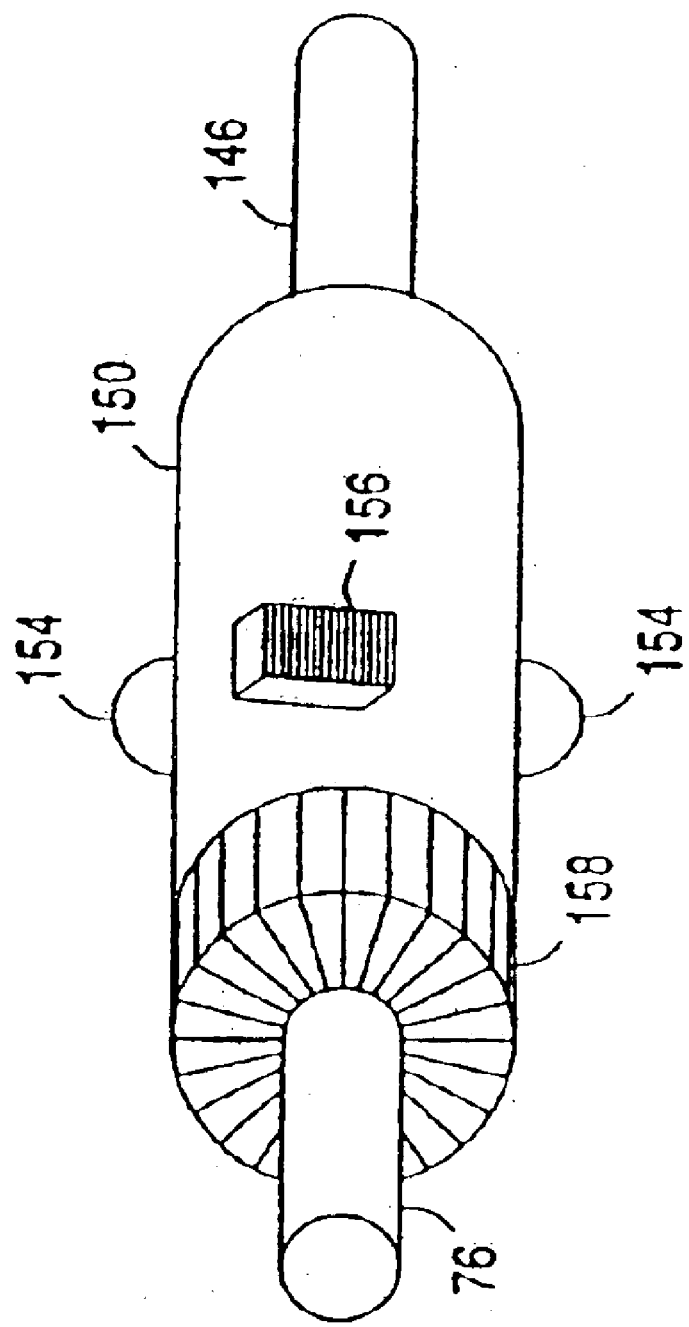

FIG. 7A shows the second embodiment of a simulated endoscope 146. The movements and actions of simulated endoscope 146 are controlled through a set of controls 148. The tip of simulated endoscope 146 is contained within a guiding sleeve 150. Guiding sleeve 150, shown in greater detail in FIG. 7B, preferably remains within the simulated gastrointestinal tract (not shown; see FIG. 7C) in order to maintain a realistic visual appearance of simulated endoscope 146 before insertion into the mannequin (not shown). Preferably, the tip of endoscope 146 has a metal bracket 152 attached, which could be labeled with the word "sample" or with another label in order to clarify that endoscope 146 is only a simulation and not an actual medical instrument. The inside of guiding sleeve 150 is preferably magnetized, for example with an electric current. Thus, when the tip of endoscope 146 is inserted in the mannequin, metal bracket 152 is attracted to guiding sleeve 150 so that guiding sleeve 150 remains attached to the tip of endoscope 146.

Guiding sleeve 150 has at least one, and preferably a plurality of, ball bearings 154 attached to the exterior surface of guiding sleeve 150. In addition, guiding sleeve 150 has at least one, and preferably a plurality of, attached plungers 156. As shown in the detailed view in FIG. 7B, one end of guiding sleeve 150 preferably features a section of flexible material 158. As shown, the tip of endoscope 146 is preferably inserted through guiding sleeve 150, The tip of endoscope 146 features sensor 76, as for the previous embodiment of the simulated endoscope.

Figure 7C:
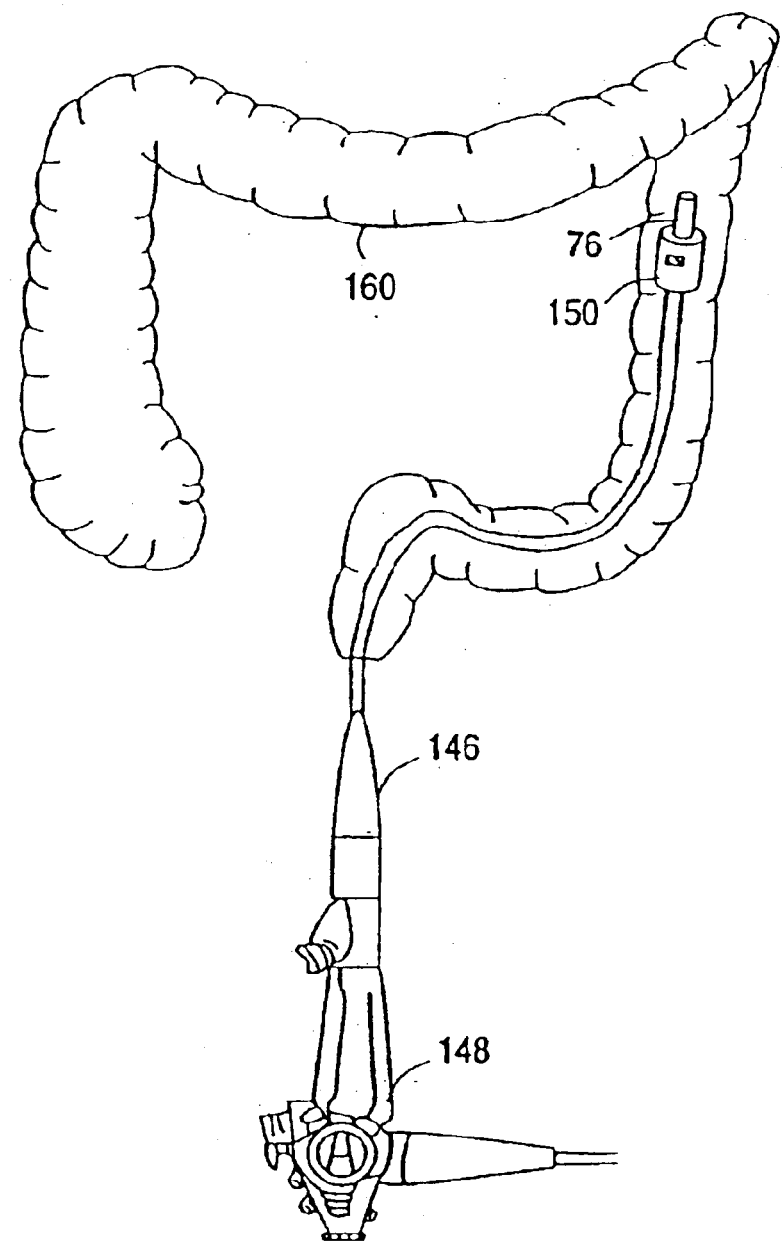
Figure 7D:
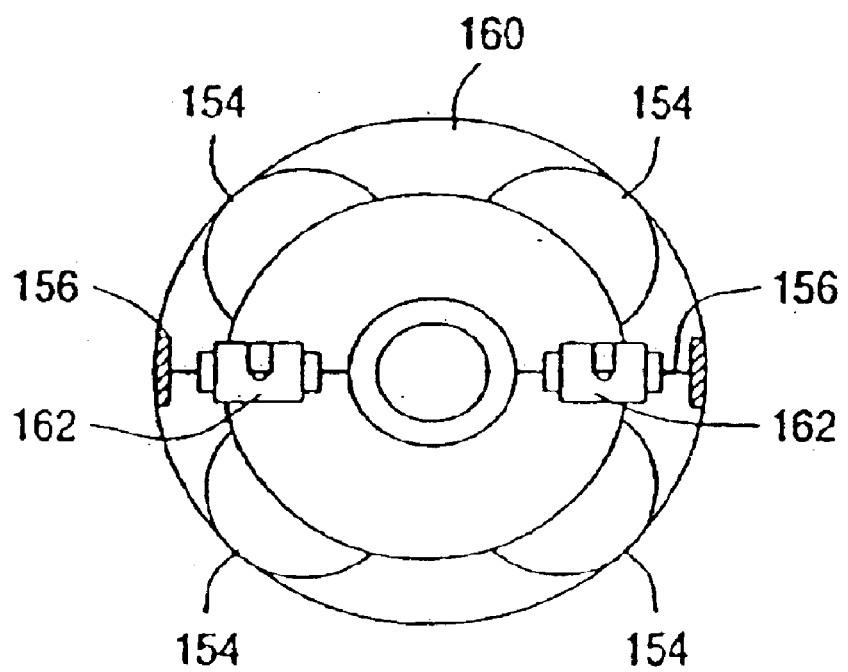

FIG. 7C shows simulated endoscope 146 after insertion within the second embodiment of a simulated gastro-intestinal tract 160. Simulated gastro-intestinal tract 160 is preferably constructed from a rigid material. In addition, simulated gastro-intestinal tract 160 preferably has the general anatomical shape and features of an actual gastro-intestinal tract for two reasons. First, the general anatomical shape can be more easily contained within the mannequin because of its bends and turns. Second, the general anatomical shape can provide gross tactile feedback. For example, as any endoscope is inserted more deeply into the colon, the shape of the colon causes the tactile sensations to be altered as the endoscope moves around a bend in the colon. Thus, the general anatomical shape is more useful for an effective simulation.

As endoscope 146 moves within simulated gastro-intestinal tract 160, guiding sleeve 150 enables the operator to receive tactile feedback as follows. Ball bearings 154 roll along the interior surface of gastrointestinal tract 160. Each ball bearing 154 has five degrees of freedom for movement. Each plunger 156 is connected to a linear motor 162, as shown in cross-section in FIG. 7D. Linear motor 162 is controlled in a similar fashion as the servo-motor of the previous embodiment. Upon receipt of signals from the computer, linear motor 162 causes plunger 156 to move vertically, thereby causing the operator of simulated endoscope 146 to receive tactile feedback sensations. Thus, guiding sleeve 150 causes tactile feedback to be transmitted back through endoscope 146.

In addition, as noted above guiding sleeve 150 preferably has section of flexible material 158. Section of flexible material 158 causes the tip of endoscope 146 to encounter some resistance under certain circumstances, such as when the tip is bent back on itself. Thus, section of flexible material 158 restrains movement of the tip from certain angles.

The particular advantages of this second embodiment is that the majority of tactile sensations are determined by the endoscope itself, so that they can be more easily controlled from the PC computer. Furthermore, such anatomical features as a fistula can be added according to instructions from the computer, without the necessity of changing the physical model of the simulated gastro-intestinal tract. Additionally, under certain circumstances the tissue of the actual colon will force the endoscope backwards, a situation which can be more easily replicated in the second embodiment. Thus, the second embodiment of the simulated gastro-intestinal tract and endoscope is more flexible in terns of replicating a greater variety of anatomical features and conditions.

Figure 8A:
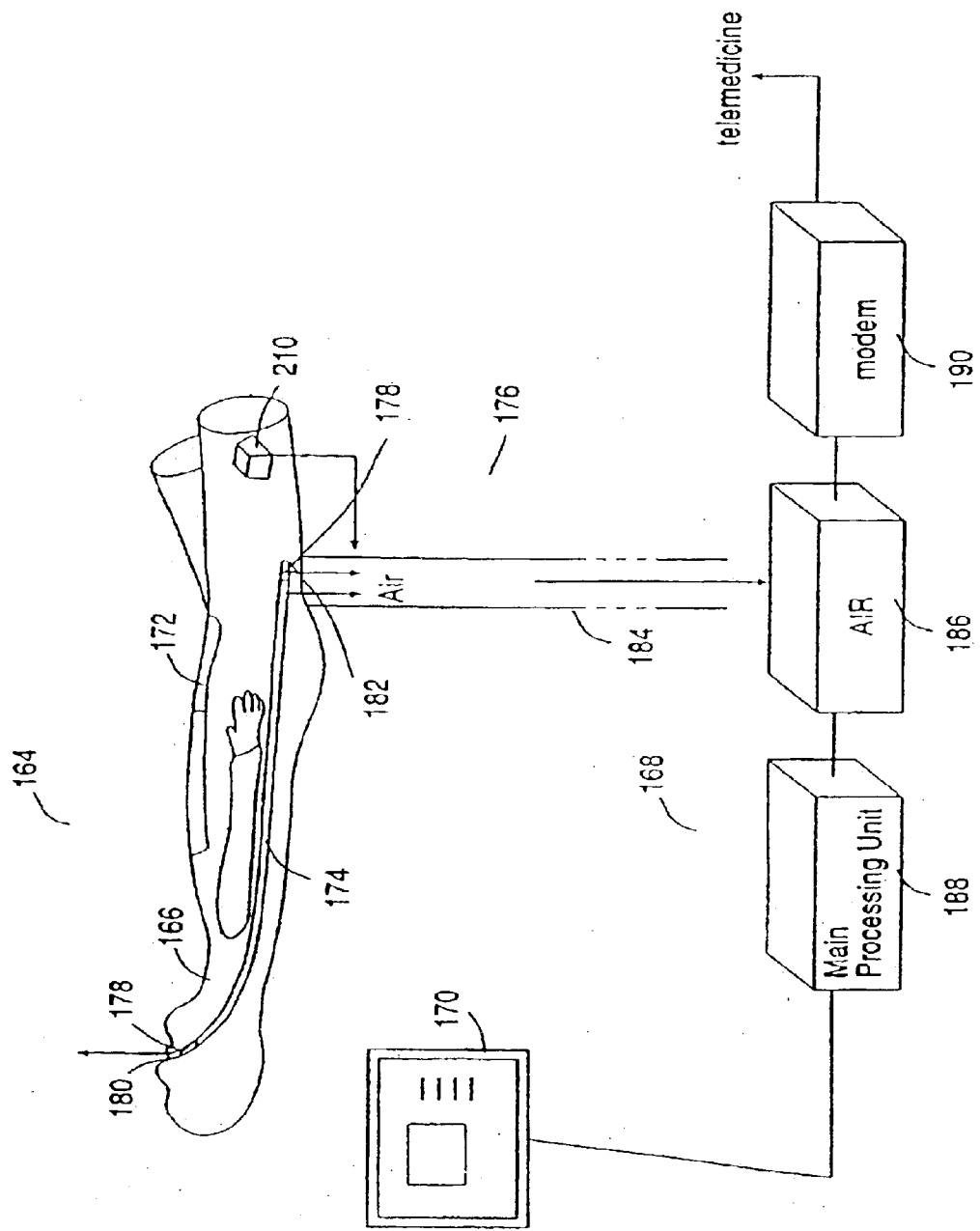
FIGS. 8A–8E show another embodiment of the system according to the present invention.

FIGS. 8A–8E show yet another and particularly preferred embodiment of the simulated endoscope and colon according to the present invention. FIG. 8A shows a preferred system for medical simulation according to the present invention. A system 164 includes a mannequin 166 representing the subject on which the procedure is to be performed, a simulated endoscope (not shown, see FIG. 8D) and a computer 168 with a video monitor 170. Mannequin 166 preferably includes a palpable area 172 for determining the location of the simulated endoscope by feeling the abdominal area of mannequin 166. Palpable area 172 preferably features a light (not shown), such that when the student has determined the location of the simulated endoscope, the light is lit to show the actual location of the simulated endoscope.

Mannequin 166 also includes a simulated organ 174 into which the simulated endoscope is inserted. Preferably, simulated organ 174 is a colon, which more preferably is constructed as a straight tube, with the force feedback required for the curves in the colon provided through a force feedback mechanism 176. More preferably, the visual feedback for the simulated medical procedure does not depend upon the geometrical shape of simulated organ 174 itself, such that the visual feedback and the tactile feedback are both substantially completely independent of the construction of simulated organ 174.

Figure 8B:
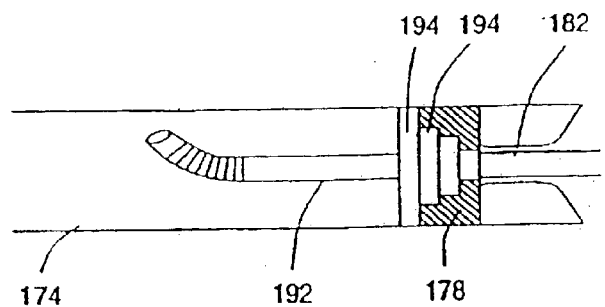
Figure 8C:
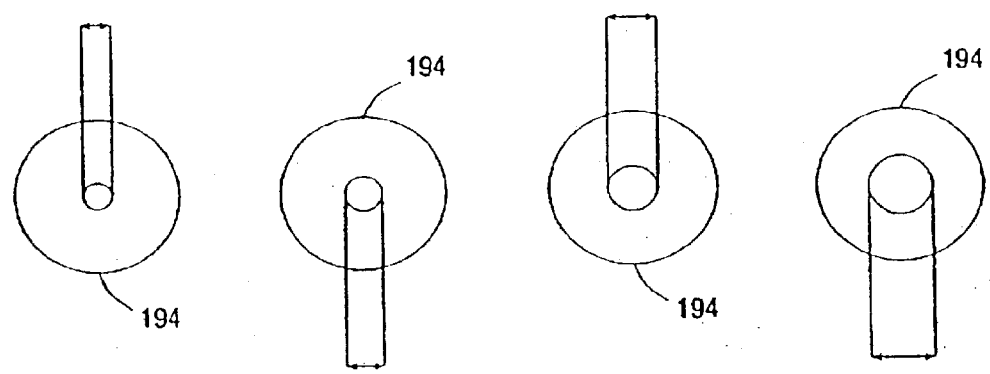
Figure 8D:
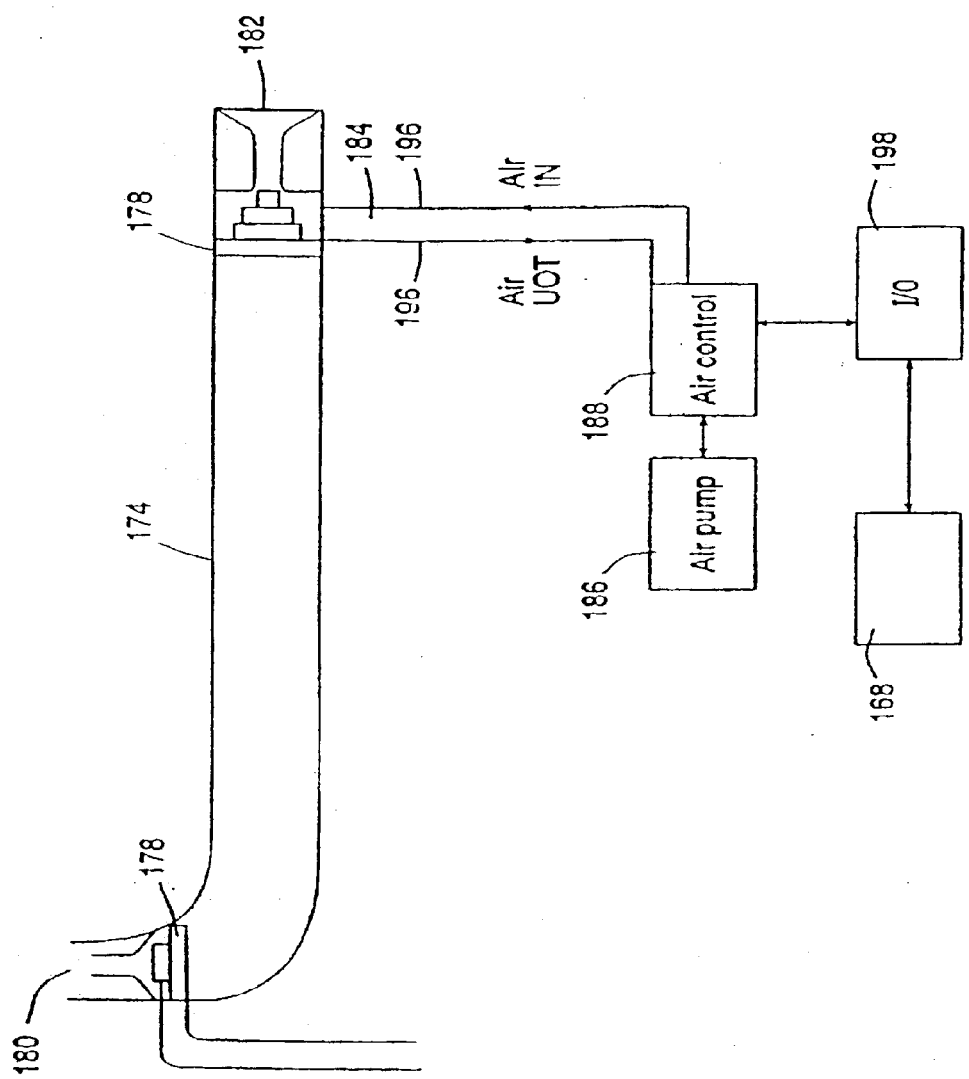
Figure 8E:
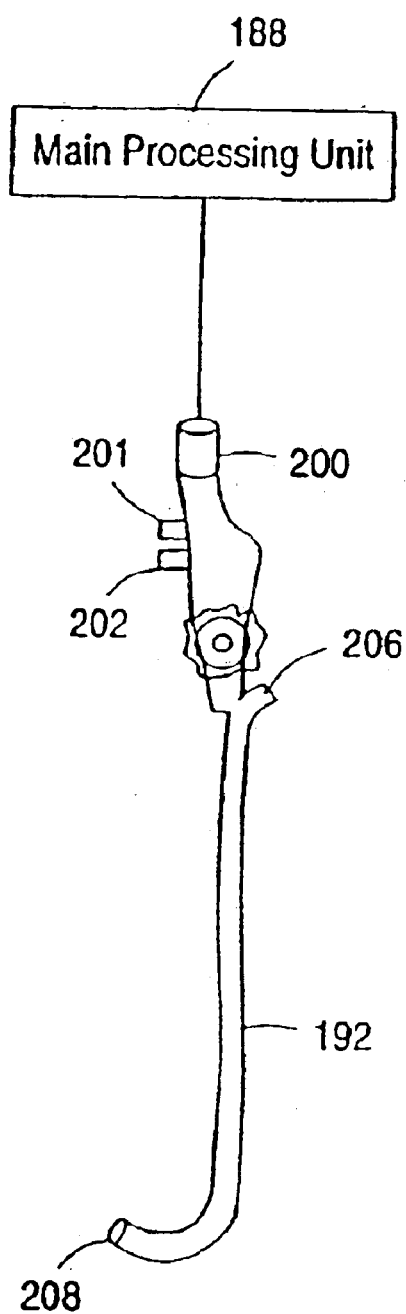

Force feedback mechanism 176 preferably includes an air-driven force feedback device 178 (shown in more detail in FIGS. 8B, 8D and 8E). More preferably, two such air-driven force feedback devices 178 are provided, one near a mouth 180 of mannequin 166, and the other near a rectum 182 of mannequin 166. An air tube 184 connects each air-driven force feedback device 178 to an air-pump 186. Preferably, air-pump 186 also includes an air-pump control unit 188 which is connected to computer 168 for controlling the amount of air pumped into air-driven force feedback device 178.

Computer 168 also preferably includes a modem 190 for communication with other computers. For example, modem 190 could enable computer 168 to connect to the Internet or intranet for performing telemedicine, or to connect to the intranet/computer network of the manufacturer for repair or trouble-shooting.

FIGS. 8B and 8C show components of air-driven force feedback device 178 in more detail. As shown in FIG. 8B, a portion of a simulated endoscope 192 interacts with air-driven force feedback device 178 to provide force feedback to the student. Force feedback device 178 features a plurality of inflatable rings 194 (shown in more detail in the fully inflated position in FIG. 8C). Each inflatable ring 194 preferably has a different radius. More preferably, there are four such rings 194, at least one of which has a larger radius than endoscope 192 and at least one of which has a smaller radius than endoscope 192. The amount of air fed into rings 194 determines the degree of inflation of each ring 194, preferably separately, thereby determining the amount of force exerted onto endoscope 192.

Preferably, each ring 194 requires one second or more preferably less than one second to reach the fully inflated position. The air flow rate is preferably up to 100 liters per minute and the pressure is up to 3 atmospheres. Rings 194 are preferably used both for passive force feedback, such as from the contraction of the rectum, and for active force feedback, for example when air is pumped into simulated organ 174 according to a functional feature of simulated endoscope 192 (see FIG. 8E).

FIG. 8D shows force feedback mechanism 176 in more detail. Preferably, rings 194 are connected to air pump 186 through tube 184, which more preferably is split into two tubes 196, a first tube 196 for pumping air into rings 194, and a second tube 196 for pumping air from rings 194. The amount of air pumped by air pump 186 is controlled by air pump controller 188. The actions of air pump controller 188 are preferably controlled by computer 168 through an I/O (analog-to-digital) card 198.

FIG. 8E shows simulated endoscope 192 in more detail. Simulated endoscope 192 features a handle 200 with various controls, including a first control 202 for pumping air into simulated organ 174, and a second control 204 for suctioning air out of simulated organ 174. Simulated endoscope 192 preferably features a surgical tool control device 206 into which various surgical tools are optionally and preferably inserted (see FIGS. 9A–9E). Simulated endoscope 192 also preferably features a receiver 208, for example a "minibird" sensor (Ascension Ltd., Burlington, Vt., USA). Receiver 208 is located at the tip of simulated endoscope 192. Receiver 208 is designed to receive transmissions from a transmitter 210 located in mannequin 166 (see FIG. 8A), thereby determining a position of the tip of simulated endoscope 192 within simulated organ 174. Transmitter 210 is preferably a "minibird" transmitter (Ascension Ltd.). Receiver 208 then transmits these signals to computer 168, which uses these signals for determining the amount of force feedback and the visual feedback to be displayed to the student on monitor 178.

As previously described, FIGS. 9A–9E show a preferred implementation of surgical tool control device 206 into which various surgical tools are optionally and preferably inserted. Surgical tool control device 206 preferably features a forceps 212 inserted into a tool sleeve 214, thereby simulating actual forceps for an endoscope. Actual forceps are used for performing a polypectomy, and feature a loop which emerges from the tip of the forceps upon manipulation of the device. This loop is placed around the polyp and drawn tight. Electricity is then sent through the loop in order to cut the polyp and to cauterize the area.

Similar to actual forceps, forceps 212 is inserted as the student holds a forceps handle 216, preferably including a button or other control for simulating the effects of starting the flow of "electricity" through the "loop". Tool sleeve 214 features a tool control unit 218 for detecting the motions of forceps 212, and translating these motions into force feedback and visual feedback. Visual feedback includes the visual display of the forceps "loop" when appropriate, for example, as well as the display of the polyp before and after the "polypectomy". In addition, the location of the loop must be tracked, preferably including up and down movements within the endoscope, and "roll" movement of the loop. Tool control unit 218 is connected to an I/O card within the computer (not shown) for performing the necessary calculations for the various types of feedback.

Figure 9A:
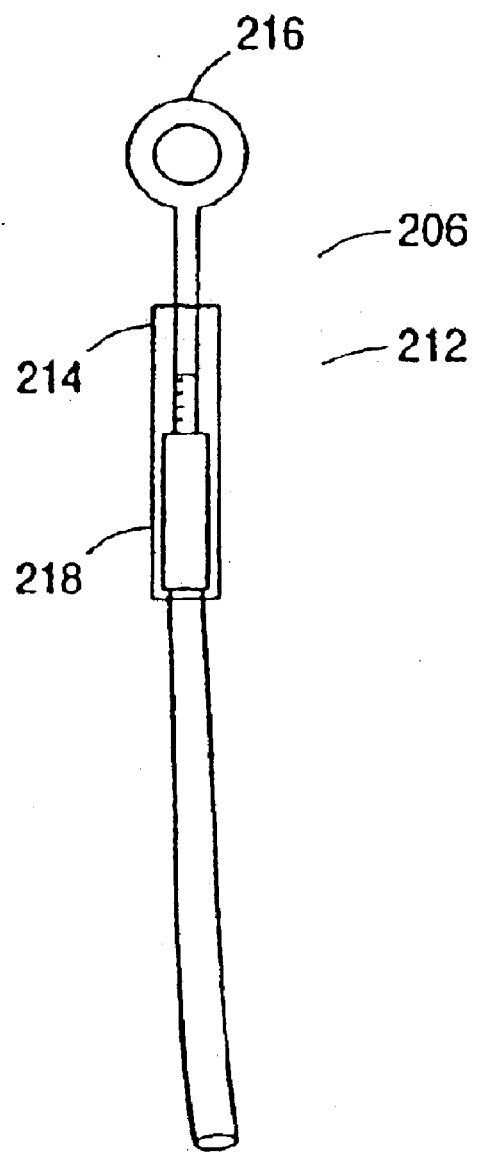
FIGS. 9A–9E show an illustrative embodiment of a tool unit according to the present invention.
Figure 9B:
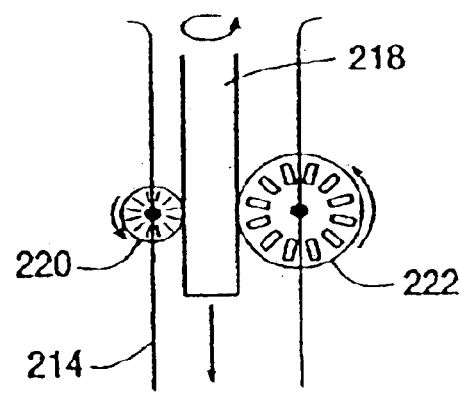
Figure 9C:
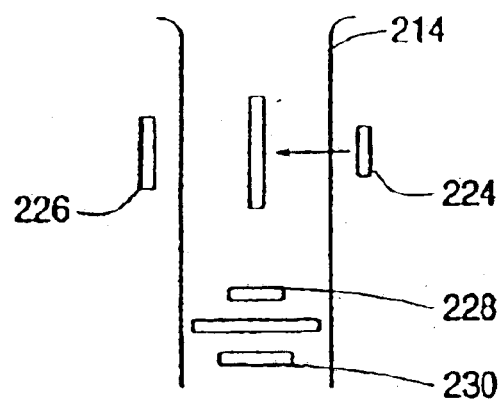
Figure 9D:
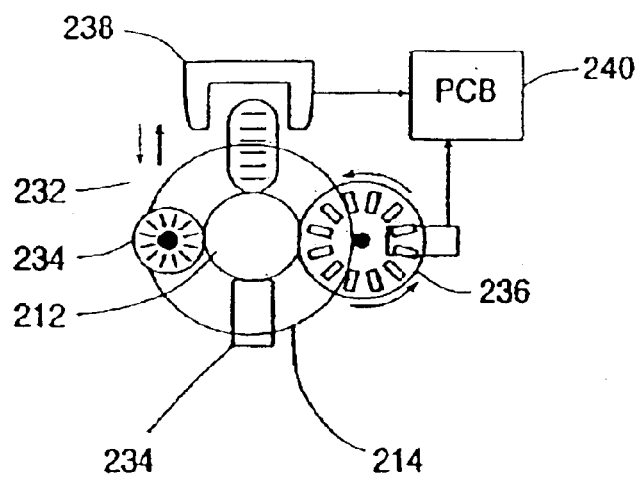

FIGS. 9B and 9C show two views of forceps 212 interacting with tool control unit 218 within tool sleeve 214. Tool control unit 218 features a guide wheel 220 and a light wheel 222 for detecting the motions of forceps 212 (FIG. 9B). Light wheel 222 features a plurality of notches through which light may pass. Tool control unit 218 also features a first light 224 and a first light sensor 226, as well as a second light 228 and a second light sensor 230 (FIG. 9C). As light wheel 222 turns with the motion of forceps 212, light passing from first light 224 and second light 228 is alternately blocked and unblocked, such that light is alternately detectable and non-detectable by first light sensor 226 and second light sensor 230.

FIG. 9C shows a second embodiment of the tool control unit. In this embodiment, a tool control unit 232 features two guide wheels 234. Guide wheels 234 help to guide the movement of forceps 212 within tool sleeve 214. A light wheel 236 also features notches through which light is alternately blocked and unblocked as forceps 212 is rotated within tool sleeve 214. A light source (not shown) produces light which is detected, if it passes through light wheel 236, by a photoelectric eye 238. Photoelectric eye 238 then sends signals to a PCB (printed circuit board) 240 which is connected to the computer (not shown), such that these signals can be translated by the computer into the required visual feedback and force feedback.

Figure 9E:
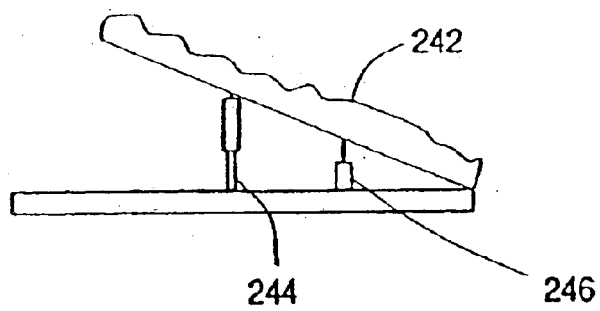

A foot pedal 242 is shown in FIG. 9E for performing a simulated polypectomy. Foot pedal 242 features an oil piston 244 and a microswitch 246. Microswitch 246 is connected to an I/O card on the computer (not shown), again for translating the movement of foot pedal 242 into the required visual feedback and force feedback.

In order to accurately replicate the tactile sensations of an actual endoscope during a medical procedure, these sensations must be accurately obtained during an endoscopic procedure in an actual living patient. For example, such tactile sensations could be collected from a physician performing the endoscopic procedure while wearing virtual reality gloves, such as the DataGloves™ Tracking VR System (Greenleaf Medical Systems). These gloves are known for being able to register data regarding tactile sensations and feedback as experienced by the physician during the actual endoscopic procedure. Such actual data are important because the tactile sensations change during the course of the procedure. For example, correlation between the movement of the endoscope and the visual display is gradually decreased as the endoscope is inserted deeper into the gastrointestinal tract. Thus, the collection of actual data is an important step in the provision of an accurate, realistic endoscopic simulator.

Finally, according to another preferred embodiment of the present invention there is provided a simulated biopsy device (not shown). This biopsy device would simulate the actual biopsy device used to retrieve tissue samples from the gastro-intestinal tract during endoscopy. The actual biopsy device is contained within the endoscope. When the operator of the endoscope wishes to take a sample, the biopsy device emerges from the tip of the endoscope, at which point it is visible on the display screen. The jaws of the biopsy device are then opened and pushed onto the tissue. The jaws are then closed, and the biopsy device retracted. The removal of the tissue causes pools of blood to appear as the remaining tissue bleeds.

Similarly, the simulated biopsy device will only appear on the display screen of the present invention when the operator of the simulated endoscope causes the simulated biopsy device to emerge. The jaws of the biopsy device are preferably rendered as animation, more preferably in relatively high resolution because the jaws are small, so that a high resolution would not prove unduly taxing for the PC computer. The bleeding of the tissue and the resultant pools of blood will also be animated.

It will be appreciated that the above descriptions are intended only to serve as examples, and that many other embodiments are possible within the spirit and the scope of the present invention.

What is claimed is:

1. A system for performing a simulated medical procedure, comprising:

(a) a simulated organ, wherein said simulated organ is a gastro-intestinal tract;

(b) a simulated instrument for performing the simulated medical procedure on said simulated organ, wherein said simulated instrument is an endoscope, said endoscope featuring a sensor for determining a location of said sensor in said gastro-intestinal tract;

(c) a locator for determining a location of said simulated instrument within said simulated organ;

(d) a visual display for displaying images according to said location of said simulated instrument within said simulated organ for providing visual feedback, such that said images simulate actual visual data received during an actual medical procedure as performed on an actual subject, said visual display including:

(i) a three-dimensional mathematical model for modeling said simulated organ according to a corresponding actual organ, said model being divided into a plurality of segments, said plurality of segments being arranged in a linear sequence;

(ii) a loader for selecting at least one of said plurality of segments from said linear sequence for display, said at least one of said plurality of segments being selected according to said location of said simulated instrument within said simulated organ;

(iii) a controller for selecting a simulated image from said segment according to said location of said simulated instrument; and (iv) a displayer for displaying said simulated image;

(e) a computer for determining said visual feedback according to said location of said sensor; and (f) a tactile feedback mechanism for providing simulated tactile feedback according to said location of said tip of said endoscope, wherein said tactile feedback mechanism is located in said endoscope, and said endoscope further comprises:

(i) a guiding sleeve connected to said tip of said endoscope;

(ii) at least one ball bearing attached to said guiding sleeve for rolling along an inner surface of said gastro-intestinal tract;

(iii) at least one motor attached to said guiding sleeve;

(iv) a piston operated by said linear motor, said piston contacting said inner surface of said gastro-intestinal tract; and (v) a controller for controlling said linear motor, such that a position of said piston is determined by said controller, and such that said position of said piston provides said tactile feedback.

2. A system for performing a simulated medical procedure, comprising:
   (a) a simulated organ;
   (b) a simulated instrument for performing the simulated medical procedure on said simulated organ, said simulated instrument featuring a sensor for determining a location of said sensor;
   (c) a locator for determining a location of a tip of said simulated instrument within said simulated organ according to said sensor;
   (d) a visual display for displaying images according to said location of said simulated instrument within said simulated organ for providing visual feedback, such that said images simulate actual visual data received during an actual medical procedure as performed on an actual subject, said visual display including:
      (i) a three-dimensional mathematical model for modeling said simulated organ according to a corresponding actual organ, said model being divided into a plurality of segments, said plurality of segments being arranged in a linear sequence;
      (ii) a loader for selecting at least one of said plurality of segments from said linear sequence for display, said at least one of said plurality of segments being selected according to said location of said simulated instrument within said simulated organ;
      (iii) a controller for selecting a simulated image from said segment according to said location of said simulated instrument; and
      (iv) a displayer for displaying said simulated image; and
   (e) a tactile feedback mechanism for providing simulated tactile feedback according to said location of said tip of said endoscope, wherein said tactile feedback mechanism features;
      (i) a plurality of rings surrounding said endoscope, each ring having a different radius, at least a first ring featuring a radius greater than a radius of said endoscope and at least a second ring featuring a radius less than said radius of said endoscope, said radius of each of said plurality of rings being controlled according to a degree of inflation with air of each of said plurality of rings, said radius of said rings determining movement of said endoscope;
      (ii) an air pump for pumping air into said plurality of rings;
      (iii) at least one tube for connecting said air pump to said plurality of rings; and
      (iv) an air pump controller for determining said degree of inflation with air of said plurality of rings by controlling said air pump.

3. A system for performing a simulated medical procedure, comprising:
   (a) a simulated organ;
   (b) a simulated instrument for performing the simulated medical procedure on said simulated organ, wherein said simulated instrument is an endoscope featuring an endoscope cable, said endoscope cable forming a loop from a movement of said endoscope in said simulated organ;
   (c) a locator for determining a location of said simulated instrument within said simulated organ; and
   (d) a visual display for displaying images according to said location of said simulated instrument within said simulated organ for providing visual feedback, such that said images simulate actual visual data received during an actual medical procedure as performed on an actual subject, said visual display including:
      (i) a three-dimensional mathematical model for modeling said simulated organ according to a corresponding actual organ, said model being divided into a plurality of segments, said plurality of segments being arranged in a linear sequence, wherein said mathematical model features a plurality of polygons defined with respect to a spline, said spline determining a geometry of said mathematical model in three dimensions, said loop being modeled according to said mathematical model, wherein said mathematical model for said loop features a plurality of polygons defined with respect to a spline, and wherein a size of said loop is determined according to a differential between an amount of said endoscope cable within said simulated organ and a length of said simulated organ from an entry point of said endoscope to a current position of said endoscope within said simulated organ;
      (ii) a loader for selecting at least one of said plurality of segments from said linear sequence for display, said at least one of said plurality of segments being selected according to said location of said simulated instrument within said simulated organ;
      (iii) a controller for selecting a simulated image from said segment according to said location of said simulated instrument; and
      (iv) a displayer for displaying said simulated image.

4. A system for simulating a medical procedure, the system comprising:
   (a) an instrument for being manipulated for performing the simulated medical procedure;
   (b) a three-dimensional mathematical model of an organ, such that a virtual location of said instrument in the organ during the simulated medical procedure is determined according to said three-dimensional mathematical model, wherein said mathematical model features a spline, said spline determining a geometry of said mathematical model in three dimensions;
   (c) a visual display for providing visual feedback according to said virtual location and said three-dimensional mathematical model; and
   (d) a tactile feedback mechanism for providing simulated tactile feedback according to said virtual location of said instrument;
   wherein said instrument is an endoscope featuring an endoscopic cable, said endoscope cable forming a loop from a movement of said endoscope in the organ, said loop being modeled according to a mathematical model, wherein said mathematical model for said loop features a plurality of polygons defined with respect to a spline, and wherein a size of said loop is determined according to a differential between an amount of said endoscope cable within the organ and a length of the organ from an entry point of said endoscope to said virtual location of said endoscope within the organ.

* * * * *